United States Patent [19]

Suzuki et al.

[11] Patent Number: 5,192,965
[45] Date of Patent: Mar. 9, 1993

[54] AUTOMATIC FOCUSING DEVICE

[75] Inventors: Noboru Suzuki; Shigeo Toji, both of Tokyo, Japan

[73] Assignee: Asahi Kogaku Kogyo K.K., Tokyo, Japan

[21] Appl. No.: 879,125

[22] Filed: May 5, 1992

Related U.S. Application Data

[63] Continuation of Ser. No. 542,607, Jun. 25, 1990, abandoned, which is a continuation of Ser. No. 364,505, Jun. 9, 1989, Pat. No. 4,952,962, which is a continuation of Ser. No. 143,905, Jan. 11, 1988, abandoned.

[30] Foreign Application Priority Data

Jan. 9, 1987 [JP] Japan ............................ 62-1537[U]
Jan. 10, 1987 [JP] Japan ............................ 62-2049[U]

[51] Int. Cl.$^5$ ............................................. G03B 13/36
[52] U.S. Cl. ............................................ 354/400; 354/406
[58] Field of Search ............... 354/400, 402, 406, 407, 354/408, 286

[56] References Cited

U.S. PATENT DOCUMENTS

| | | | |
|---|---|---|---|
| 4,303,321 | 12/1981 | Enomoto et al. | 354/406 |
| 4,550,994 | 11/1985 | Maruyama | 354/402 |
| 4,705,380 | 11/1987 | Yamamoto et al. | 354/402 |
| 4,728,980 | 3/1988 | Nakamura et al. | 354/402 |
| 4,743,931 | 5/1988 | Matsuzaki et al. | 354/402 |
| 4,745,425 | 5/1988 | Kusaka | 354/400 |
| 4,772,909 | 9/1988 | Ogasawara | 354/400 |
| 4,837,594 | 5/1989 | Nakamura et al. | 354/402 |

FOREIGN PATENT DOCUMENTS 59-26709 2/1984 Japan.
62-1537 1/1987 Japan.
62-2049 1/1987 Japan.

OTHER PUBLICATIONS

"Lens Driving by Micro-processor Controlled DC Motor" by Masataka Hamada and Noria Ishikawa, *Minolta Techno Report*—Special Issue 1986.

Primary Examiner—Russell E. Adams
Attorney, Agent, or Firm—Sughrue, Mion, Zinn, Macpeak & Seas

[57] ABSTRACT

Disclosed herein is an automatic focusing device high in focusing accuracy, in which an amount of drive for driving a focusing lens to a position focused on an object can be renewed during the focusing lens moving to the focused position. Further, the automatic focusing device is provided with a speed changing means capable of changing the movement speed of the focusing lens according to an amount of drive to the focused position.

14 Claims, 19 Drawing Sheets

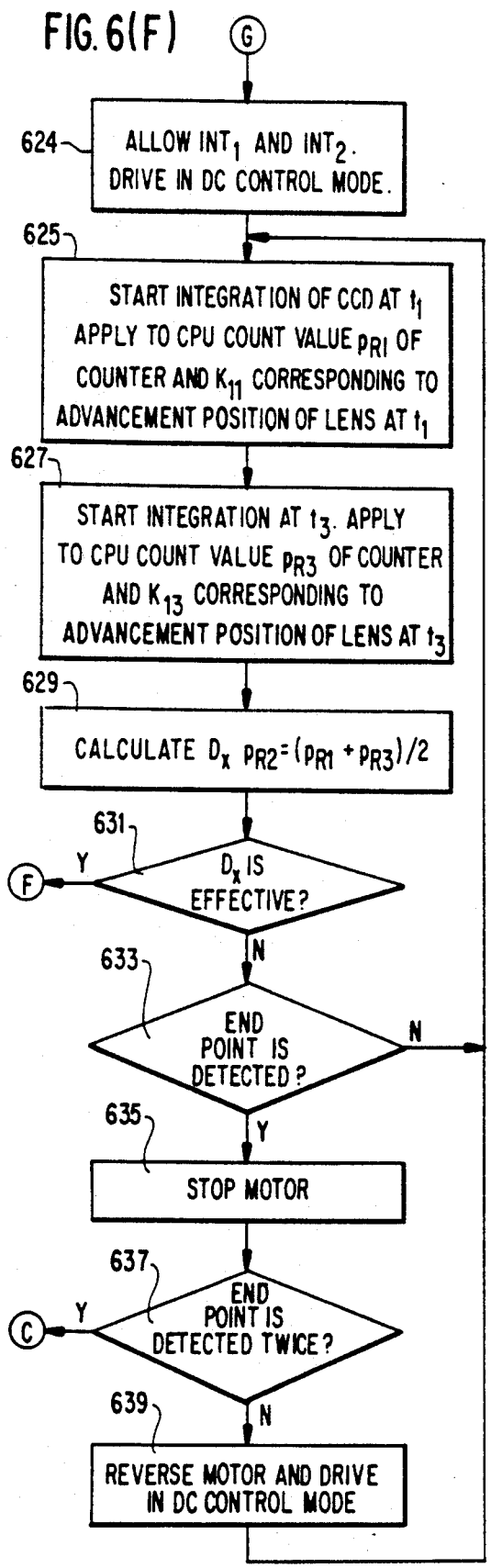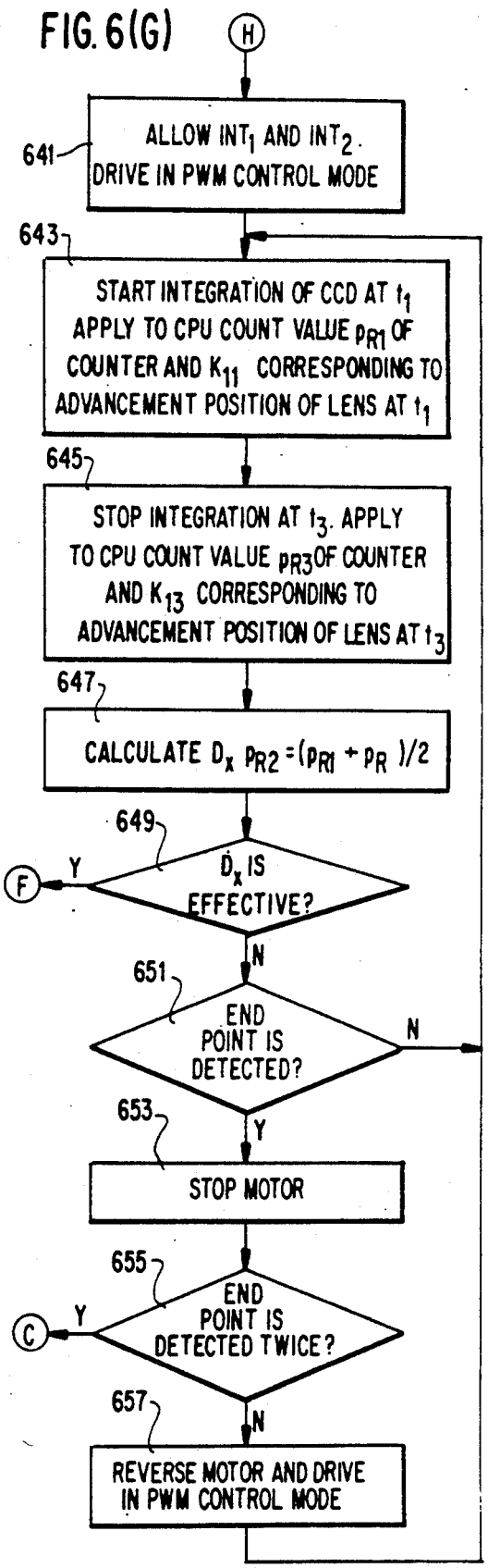

AUTOMATIC FOCUSING DEVICE

This is a continuation of application Ser. No. 07/542,607 filed Jun. 25, 1990 now abandoned, which is a continuation of 07/364,505 filed Jun. 9, 1989, now U.S. Pat. No. 4,952,962, which is a continuation of 07/143,905 filed Jan. 11, 1988 now abandoned.

BACKGROUND OF THE INVENTION (1) Field of the Invention

This invention relates to an apparatus having an automatic focusing (AF) function such as an AF camera, and more particularly to an automatic focusing device capable of accurately moving a focusing movable lens to a focused position and changing the moving speed of the focusing lens according to an amount of defocusing to the focused position during the focusing operation.

(2) Description of the Prior Art

Recently, there have been available some interchangeable-lens cameras having an AF function.

FIG. 1 is a block diagram outlining the general construction of an interchangeable-lens camera of this type. More specifically, FIG. 1 mainly shows components of the camera which concerns the AF mechanism, not showing components which are generally provided for a camera and a lens.

In FIG. 1, reference numeral 11 designates a camera body; and 31, a photographical lens detachably mounted on the camera body 11. The camera body 11 and the lens 31 are mechanically connected to each other through a clutch 13 on the body side and a clutch 33 on the lens side, and are electrically connected to each other through an electrical contact group 15 on the body side and an electrical contact group 35 on the lens side.

The photographing lens 31 comprises: a lens system 39 including a focusing lens 37 which is movable along the optical axis; a drive force transmitting mechanism 41 for transmitting a drive force from a drive source (described later) to the lens 37 to move the latter 37 to a focused position to an object; and a lens ROM 43 for storing the aperture data of the photographing lens, the position data of the movable lens 37 and the like.

On the other hand, the camera body 11 comprises: an image pickup section 17 having, for instance, a CCD (charge-coupled device) sensor to receive a part of the light beam passed through the photographing lens 31 thereby to form the image of the object. The camera body 11 further comprises: a control section 19 having a variety of functions such as a function of calculating an amount of defocusing D (including a direction of defocusing) indicating the amount of deviation from the focusing position in response to the output signals of the image pickup section 17 and a function of determining the direction of movement of the lens for focusing the lens 37 on an object. The camera body 11 further comprises: a drive mechanism 25 including an electric motor 21 for driving the movable lens 37 in the photographing lens 31, and an encoder 23 for controlling the number of revolutions of the motor 21. The drive force of the drive mechanism 25 is transmitted through the clutch mechanism 13 and 33 and the drive force transmitting mechanism 41 to move the movable lens 37.

An amount of drive P moving the movable lens 37 to the focused position can be determined in terms of a number of rotations of the motor 21, that is, it can be set according to the pulse count number of the pulse signal from the encoder 23 which detects the number of revolutions of the motor 21. In the conventional AF camera, the amount of defocusing D is calculated by the control section 19, and the pulse count value P corresponding to the amount of defocusing D is calculated according to the following equation (1):

$$P = K \cdot D \tag{1}$$

where K is the lens movement conversion coefficient. The coefficient K is predetermined so as to obtain a pulse count number P allowing the movable lens 37 to move to the position where the lens is positively focused on the object according to the amount of defocusing D, and each photographing lens has its own coefficient K. The coefficient K is stored in the lens ROM 43 of the photographing lens. In the case where the photographing lens is a zoom lens, a plurality of coefficients are stored in the lens ROM.

The movable lens 37 is continuously moved until the number of pulses of the output signal from the encoder 23 reaches the pulse count value P calculated according to equation (1).

In the case where it is required to focus the lens on an object with higher accuracy, the lens is driven intermittently; that is, the lens is moved by small intervals, and every time the lens is moved, a focusing pulse count value is newly obtained.

A method for obtaining an amount of defocusing with respect to an object to be photographed will be described hereinafter.

First, the CCD sensor of the image pickup section 17 receives light from the object to provide defocusing data including an amount of defocusing and a direction of defocusing according to the correlation method. However, in the case where the present position of the movable lens is for from the focused position for the object, it is sometimes impossible to determine an amount of defocusing effectively in calculating the amount of drive to the focused position. That is, sometimes the amount of defocusing cannot be obtained or the amount of defocusing includes an error. In this case, heretofore the following method is employed: The movable lens, after being moved for a distance in one direction at a constant speed, is stopped, and an amount of defocusing is obtained as described above. This operation is repeatedly carried out until the amount of defocusing thus obtained is effectively determined. In the case where the lens is moved in one direction, and no effective amount of defocusing is obtained although the lens has reached the end point in the one direction, the lens is moved in the opposite direction, and the above-described series of operations are carried out until the amount of defocusing is determined.

However, when the movable lens is moved at a stretch according to the amount of drive of the movable lens obtained according the amount of defocusing D, sometimes the resultant focal accuracy of the lens is lower than required.

This difficulty is significant when the amount of defocusing is large. That is, when the lens is greatly defocused from an object, the amount of defocusing obtained is often incorrect, including an error. Therefore, the amount of drive of the lens to the focused position obtained from the amount of defocusing includes an error, as a result of which the lens is not satisfactorily focused on the object. Generally, in order to move the movable lens 37 to the focused position, the motor 21 is driven continuously in a DC control mode. In this case, the movable lens 37 further moves due to its inertia. Accordingly, the motor 21 has to be stopped immediately before a pulse count value of a pulse signal from the encoder 23 becomes equal to the number of pulses P which is obtained according to the above equation (1).

However, the above described driving method in the DC control mode is disadvantageous in that it is somewhat difficult to stop the movable lens 31 at the focused position with high accuracy.

Further, the above cyclic operation for obtaining an amount of defocusing which is effective for the focusing operation is disadvantageous in that, since the integration of the CCD sensor is carried out after the movable lens is positioned within a suitable range from the focused position, it takes a relatively long period of time to obtain the defocusing amount thereby in requiring a long period of time for focusing. This drawback may cause the photographer to lose his chance to take a desired photograph.

In order to overcome the drawbacks, it has been proposed by the present inventors that, after the pulse count value which represents the remaining amount of drive becomes smaller than a predetermined value, the driving mode of the motor 21 is changed to a PWM (Pulse Width Modulation) mode where the motor 21 is driven intermittently to let the lens 37 approach the focused position gradually. However, in the case where the defocusing amount is extremely small, the movable lens is driven in the PWM control mode from the start of the movement. As is well known in the art, an ordinary motor requires a large amount of drive power and such a PWM control mode is not suitable to obtain the large amount of drive power. Therefore, this also results in a problem such that the lens may not be started and moved to the focused position quickly.

SUMMARY OF THE INVENTION

Accordingly an object of this invention is to eliminate the above-described difficulties accompanying a conventional focusing system. More specifically, an object of the invention is to provide a focusing device in which, while the movable lens is being moved towards a focused position, the speed of movement of the lens to the focused position is changed gradually according to an amount of defocusing with respect to an object so that the lens is focused on the object accurately and quickly.

BRIEF DESCRIPTION OF THE DRAWINGS

In the accompanying drawings,

FIGS. 6(A), 6(B), 6(C), 6(D), 6(E), 6(F) and 6(G) are flow charts showing a second embodiment of the operation of the focusing device according to the present invention;

DESCRIPTION OF PREFERRED EMBODIMENTS

Figure 1:
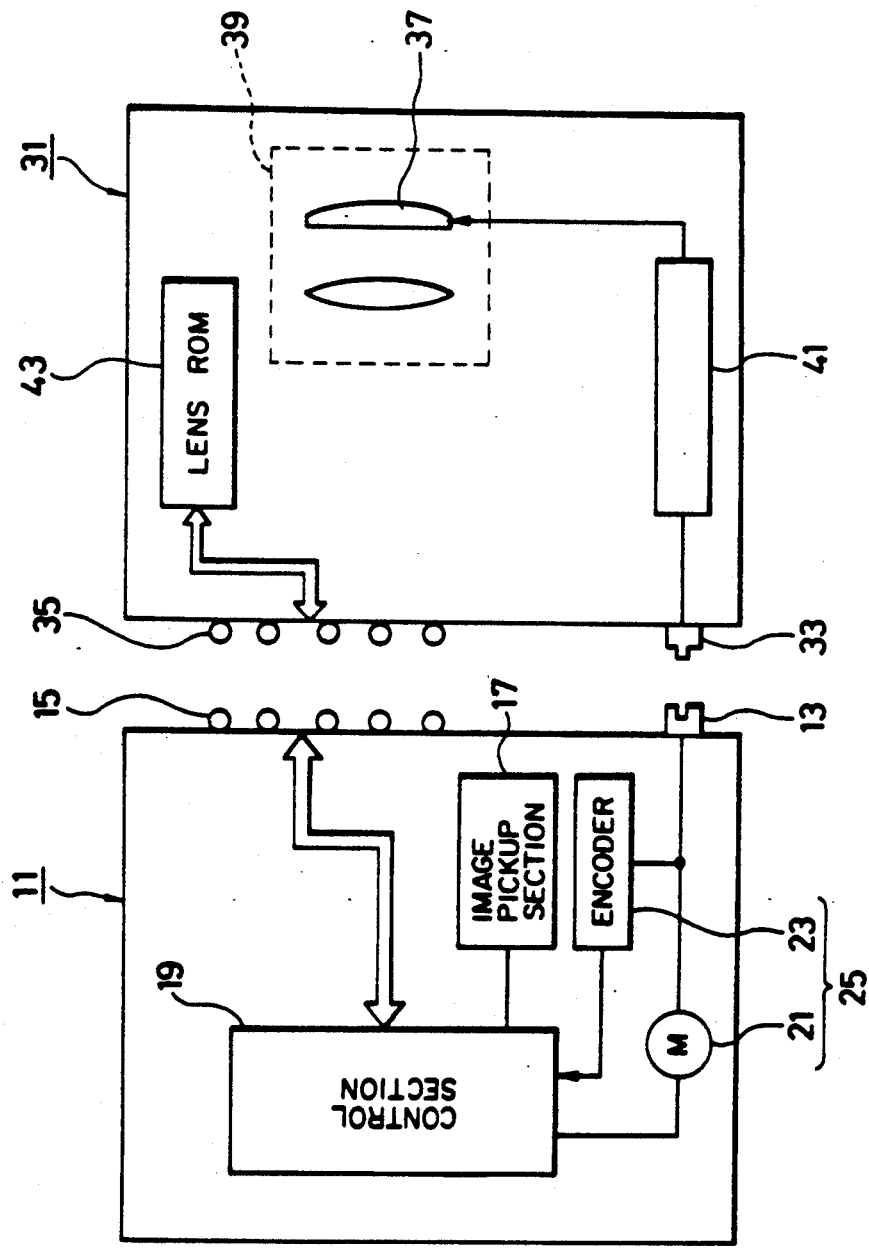
FIG. 1 is a schematic diagram illustrating the general construction of an interchangeable-lens camera.

One preferred embodiment of this invention will described with reference to the accompanying drawings. These drawings are simplified to the extent that the invention can be understood. It goes without saying that the dimensions, configurations and arrangement of the components of the embodiment are not limited to those shown in the drawings. In the drawings, like parts are designated by like reference numerals or characters.

As was described with reference to FIG. 1, in order to obtain based on an amount of defocusing D, a pulse count value P of a signal output by an encoder, which is required to move the movable lens of the photographing lens to a focused position, it is necessary to determine a pulse count value P according to an amount of movement of the lens which can eliminate the amount of defocusing D to thereby obtain an approximate expression indicating the relation between the values D and P accurately. The amount of drive for the movable lens, i.e., the pulse count value P is expressed by the following equation (3):

$$P = \sum_{i=1}^{n} K_i \cdot D^i \qquad (2)$$

In an embodiment described herein after, an example of the approximate expression is as follows.

$$P = K \cdot D \qquad (1)$$

where n=1.

However, it should be noted that the approximate expression is not limited to equation (1) only; that is, it may be the following equation (3) including the second term:

$$P = K_1 D + K_2 D^2 \qquad (4)$$

where K, $K_1$ and $K_2$ are lens movement conversion coefficients representing the number of pulses per unit movement value of the image formed by the movable lens. The coefficient is determined for each photographing lens so as to obtain a pulse count value P of an output signal from an encoder, which allows the movable lens to move to a position where the lens is positively focused on an object according to an amount of defocusing D.

Figure 2:
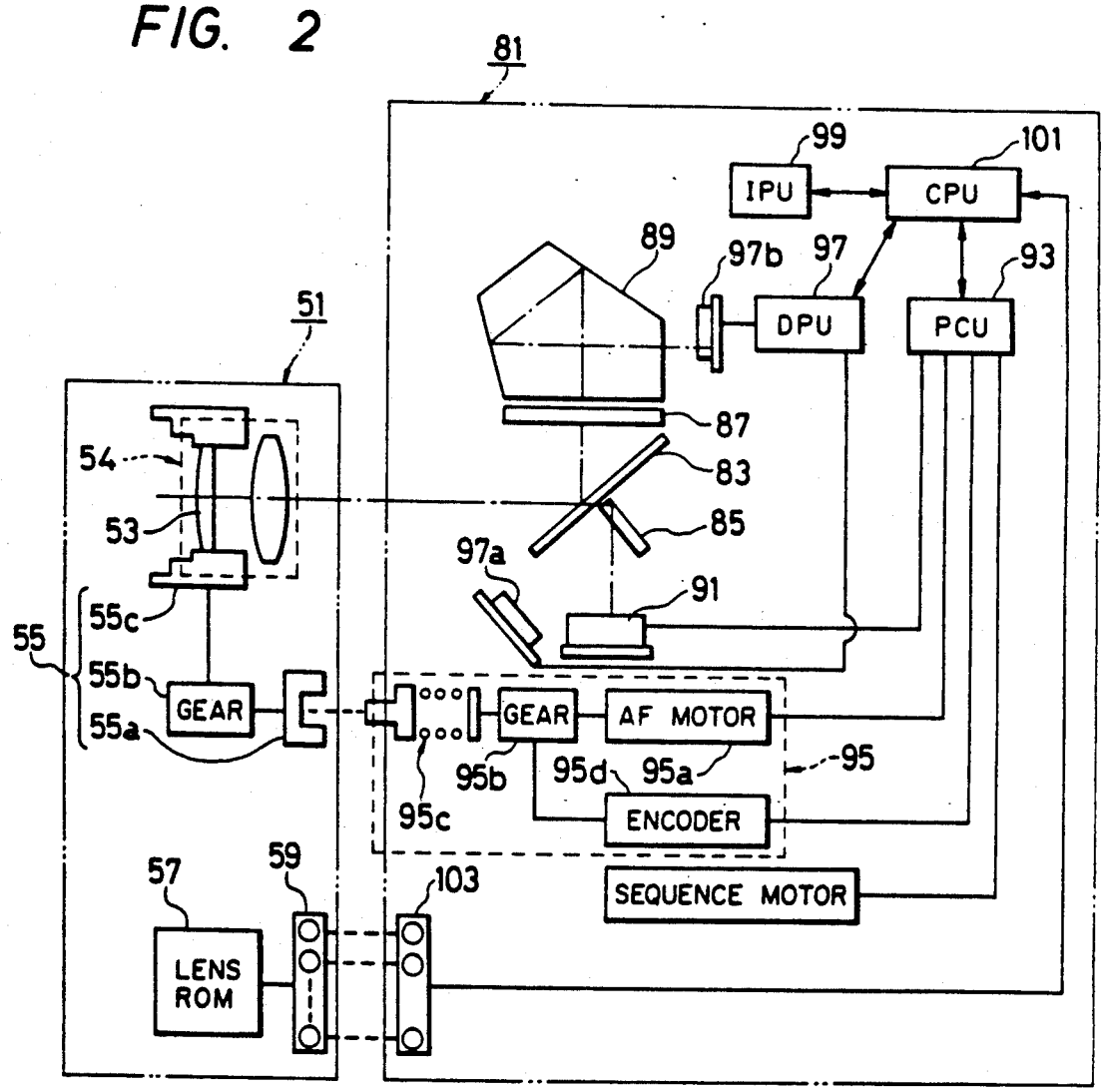
FIG. 2 is a block diagram showing the arrangement of an example of a single lens reflex camera having an automatic focusing device according to the present invention.

FIG. 2 is a block diagram outlining the arrangement of one example of a camera provided with a device for changing the speed of movement of a focusing lens according to the present invention (hereinafter referred to as a speed changing device when applicable). Descriptions of components which are generally provided for a camera and a lens and are not necessary for a description of the invention are omitted intentionally.

In FIG. 2, reference numeral 51 designates a photographing lens; and 81, a camera body on which the photographing lens 51 is mounted.

The photographing lens 51 comprises: a lens system 54 including a focusing lens 53 which is movable along an optical axis; a drive force transmitting mechanism 55 including a clutch 55a, a gear 55b and a helicoid gear 55c for transmitting a drive force from a drive source (described later) in the camera body 81 to move the movable lens 53 to a focused position; a lens ROM 57 for storing the aperture data of the photographing lens 51, the advancement position data of the movable lens 53 and the like; and an electrical contact group 59 on the lens side for electrically connecting the photographing lens 51 to the camera body 81.

Figure 5A:
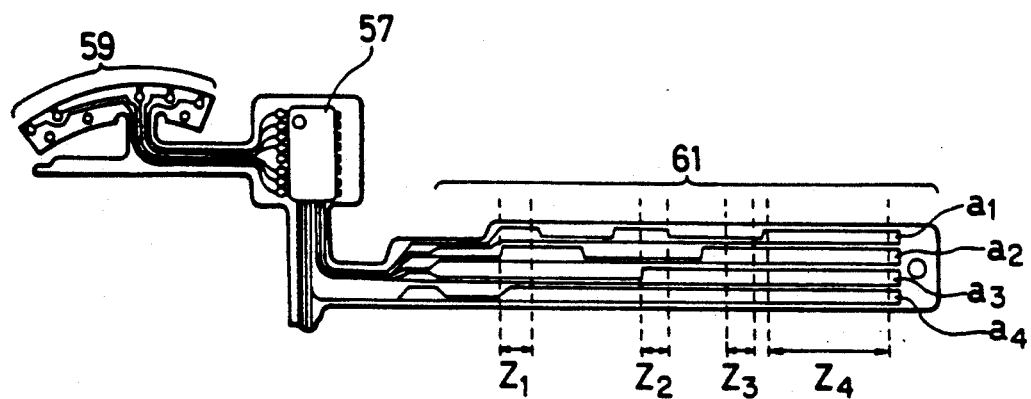
FIG. 5(A) is a schematic diagram illustrating a distance code plate.

The photographing lens 51 further includes a distance indicating ring gauged with the movement of the movable lens 53, a brush member secured to the distance indicating ring, which is moved according to the rotation of the distance indicating ring, and a distance code plate with which the brush member contacts slidably. FIG. 5(A) is a schematic diagram illustrating the construction of the distance code plate. In FIG. 5(A), reference numeral 61 designates the distance indicating plate. The lens ROM 57 and the electrical contact group 59 are provided as shown in FIG. 5(A). The function of the distance code plate 61 will be described later in detail.

On the other hand, the camera body 81 comprises: an optical system including a main mirror 83, an auxiliary mirror 85, a focusing screen 87 and a pentagonal prism 89. The camera body 81 further comprises: an image pickup section 91 for receiving a part of the light beam passed through the photographing lens 51 to form the image of the object. The image pickup section 91 may be designed so as to meet a kind of a focusing position detecting system. In the embodiment, the image pickup section 91 comprises an optical system including a separator lens according to a correlation method (phase difference system) and a CCD (charge-coupled device) having two image pickup regions. The camera body 81 further comprises an automatic focusing (AF) control section (PCU) 93 capable of controlling the image pickup section and a drive mechanism (described later) for driving the movable lens 53 and the drive mechanism 95 having, for instance, an automatic focusing (AF) motor 95a, a gear 95b, a clutch 95c and an encoder 95d for controlling the number of revolutions of the motor 95a, to drive the movable lens 53 in the photographing lens 51. The drive force of the drive mechanism 95 is transmitted through the clutch 95c on the body side and the clutch 55a on the lens side to the movable lens 53 to move the lens 53 along the optical axis. By rotating the motor 95a at a constant speed, the movable lens can be moved at a constant speed.

The camera body 81 further comprises: light receiving elements 97a and 97b, an AE (automatic exposure) control section (DPU) 97 for automatic exposure control; a display control section (IPU) 99 for controlling a display operation; a central control unit (CPU) 101 for controlling the above-described control section 93, 97 and 99; and an electrical contact group 103 on the body side which is coupled to the electrical contact group 59 on the lens side. The CPU 101 also controls the lens ROM 57 of the photographing lens 51.

Figure 3A:
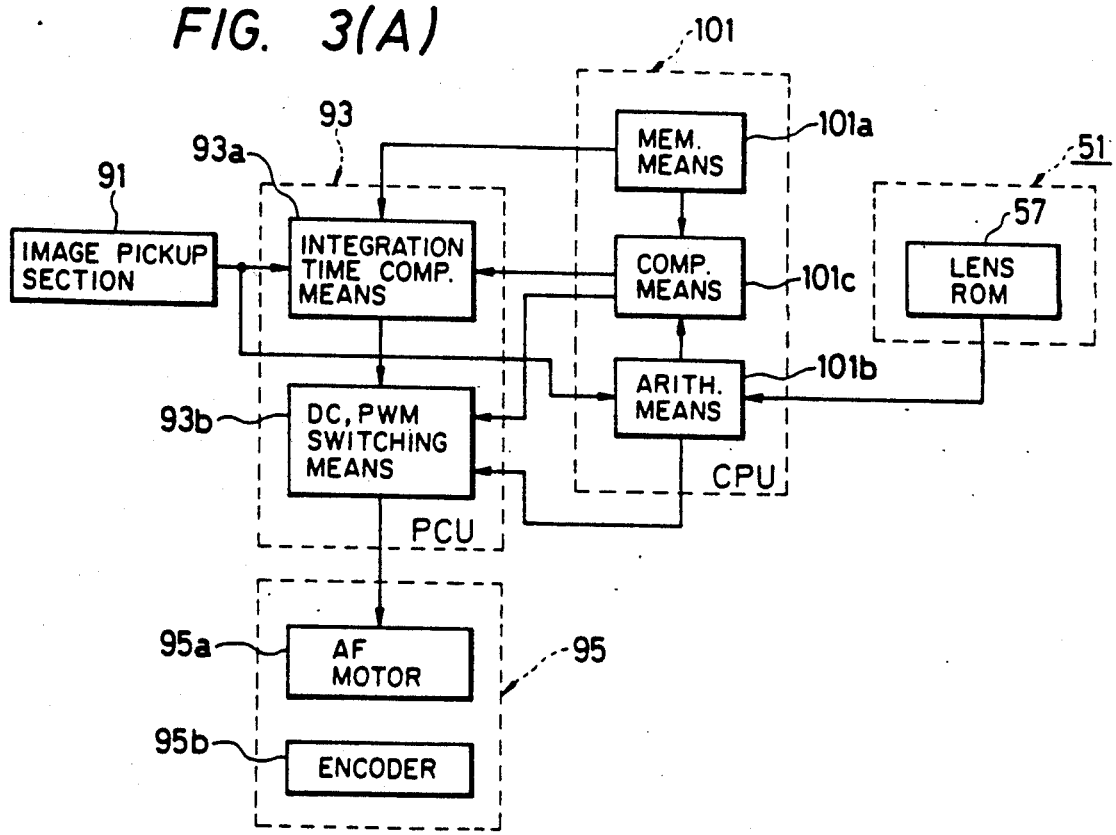
FIG. 3(A) is a block diagram for a description of the functions of a PCU 93 and CPU 101.

In this embodiment, the PCU 93 and the CPU 101 can be designed as follows: FIG. 3(A) is a block diagram for a description of the functions of the PCU 93 and the CPU 101.

The PCU 93 comprises an integration time comparison means 93a for comparing the integration time of the CCD of the image pickup section 91 with a reference integration time determined in advance and switching means 93b for producing a speed control signal to the drive mechanism 95 to change the movement speed of the movable lens 53 according to at least one of an output of the comparison means 93a, an amount of drive required to move the lens to the focused position and a remaining amount of drive required to move the same thereto during the movement In this embodiment, the switching means 93a is adapted to drive the AF motor 95a at a constant speed in the DC (direct current) control mode in case of the brightness of the object being relatively large or an amount of movement to the focused position being large. On the other hand, the switching means 93a is adapted to drive the AF motor 95a intermittently in the PWM (pulse with modulation) control mode according to the given pulse count value P in case of the brightness thereof being relatively low or the amount of movement to the focused position being relatively small.

Furthermore, during the PWM mode, it is possible to adjust the speed by varying a duty ratio of a pulse signal. In case of the defocusing amount being small the AF motor 95a should be driven in the PWM control mode from the start of the motor. It may be possible to drive it in the DC control mode for a certain period of time from the start thereof and then to drive in the PWM control mode.

The CPU 101 comprises a memory means 101a for storing a CCD's reference integration time, a reference pulse count value for causing the switching means 93b to select the DC control mode or the PWM control mode, a reference value for determining whether or not an amount of defocusing is effective, and a reference value for determining whether or not the lens is focused on the object (hereinafter referred to as "a focus determination reference value", when applicable); an arithmetic means 101b for calculating an amount of defocusing D and a pulse count value P; and a comparison means 101c for comparing an amount of defocusing D with the reference value stored in the memory means 101a.

In the camera thus constructed, the means concerning the focusing device of the invention can be formed as follows:

The image pickup section 91, the PCU 93 and the CPU 101 constitute means for obtaining an amount of defocusing and a direction of defocusing for an object. It should be noted that the term of the defocusing amount D used in the whole specification represents vector data including the amount of defocusing and a direction of the defocusing.

The image pickup section 91 and the PCU 93 constitute means for measuring the brightness of the image. The PCU 93 and CPU 101 constitute means for changing the movement speed of the movable lens 53 according to the measurement of the brightness. Further, the image pickup section 91 and the CPU 101 constitute means for calculating the defocusing amount while the movable lens 53 is moved at the movement speed thus changed.

Further, the image pickup section 91 and the CPU 101 constitute a means for renewing the amount of defocusing with respect to the object while the movable lens 53 is driven at the speed changed according to the above manner.

The coefficient K of the equation (1) (in the case of equation (3), the coefficients $K_1$ and $K_2$) which is determined for each of the photographing lens, is stored in the lens ROM 57 of the photographing lens 51.

It should be noted that the determination of the coefficients $K_1$ and $K_2$ should be carried out depending on a sort of photographing lens. Because, there is a possibility that in order to improve the accuracy in focusing, it may be better to renew the coefficients in accordance with the advancement position of the movable lens. The renewing of the coefficients can be carried out by storing a number of coefficients for the lens advancement positions in the lens ROM 57 in advance, and reading out the suitable coefficient stored in the address assigned by the code designated by the code plate 61, which varies according to the lens advancement position.

The CPU 101 constitutes means for reading the coefficient K out of the lens ROM 57 and for using the coefficient K thus read and the amount of defocusing D to obtain according to equation (1) the amount of drive for the movable lens 53 to the focused position.

The PCU 93 and the CPU 101 constitute means for obtaining, while the movable lens 53 is being moved at a constant speed, the amount of defocusing of the lens at a position and the amount of drive of the lens from that position to the focused position.

The CPU 101 constitutes means for subtracting from the amount of drive of the lens 53 obtained while the lens 53 is being moved the amount of drive thereof which is required for the calculation of the firstly mentioned amount of drive. The CPU 101 also constitutes a comparison means for comparing the amount of drive calculated with a reference value.

It is preferable in view of the following reason that the movement speed of the lens be changed according to the brightness of the object after taking the variation in the power source voltage into account. According to the present invention, in case of the defocusing amount being large, the calculation of the defocusing amount is obtained during the movable lens 53 being moved continuously, in order to make the focusing operation effective. Accordingly, in case of the brightness being low, it is necessary to drive the motor in the PWM control mode in order that the image pickup section 91 can receive a sufficient amount of light for the focusing before the the lens 53 overruns the focused position. On the other hand, in case of the brightness being high, it is necessary to drive the motor in the DC control mode in order to increase the movement speed thereof. In this case, however, assuming that the power source voltage decreases, even if the motor 95a is driven in the DC control mode, the movement speed of the movable lens 53 becomes not so high. On the other hand, assuming that the power source voltage is low, it is apparent that there is a possibility that the drive in the PWM mode may result in undesired increase of the period of time required for the focusing. To this end, it is preferable that a voltage level detector as shown in FIG. 10 be provided to detect the power source voltage level, and the detected voltage level be applied to the CPU 101 so that the movement speed may be determined after taking the voltage level into account.

Figure 10:
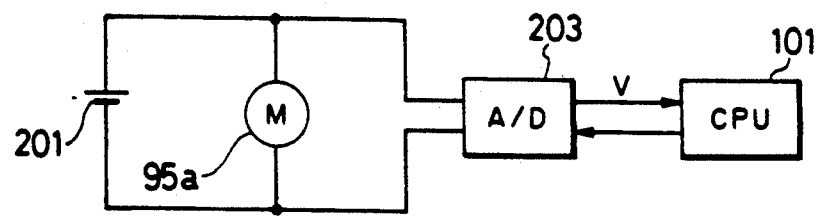
FIG. 10 is a circuit diagram showing an example of a voltage detector.

In FIG. 10, reference numeral 201 designates a battery. As shown in FIG. 10, the power source voltage is applied to both the motor 95a and an A/D converter 203 where the voltage level is converted into a digital signal. The digital signal is then applied to the CPU 101.

A variety of interchangeable lenses are used with the above described camera body. Movable focusing lenses contained in the interchangeable lenses are different from each other in their weight, moving distance construction of a driving power transmission mechanism and the like. Accordingly, it is preferable that data as to the above described matters which are used to obtain a control signal to change the rotation speed of the AF motor, be stored in each of the interchangeable lens as its characteristic values. These data may be stored individually in the memory means 101a of the CPU 101 of the camera body 81. However, this has such a disadvantage that every time when new type lens system becomes available commercially, it is necessary to write the data for the new type lens into the memory means 101a. As a result, according to the present invention, at least data representing the duty ratio is stored in the lens ROM 57 of the lens 51. The CPU 101 controls the reading operation of the necessary data from the memory means or the lens ROM so as to carry out the drive of the movable lens in a lens system mounted to the camera body correctly.

As mentioned above, the various lens systems are mounted to the camera body and different inertia occurs in each of the lens systems. Since a torque of the motor generated at the start is also different according to the lens system mounted, the driving period of time for the motor should be adjusted to each of the lens systems. According to the present invention, the data as to the driving period is stored in the lens ROM of each of the lens systems.

With respect to the variation in the driving power source level, since a battery is used as the power source generally, the voltage level gradually decreases. Thus, it is significant to obtain voltage correction coefficients (hereinafter referred to as $V_{KK}$ when applicable) to compensate the variation of the power source voltage. The coefficients are stored in a memory means as a $V_{KK}$ table. An example of the memory means is the memory means 101a of the CPU 101. In this case, these coefficients are renewed voluntarily, and therefore an E²PROM(Electrical Erasable and Programmable Read Only Memory) is preferable as the memory means.

Further, a lubricant such as a grease is applied to the transmission mechanism 55 in the lens system 51, the driving mechanism 95 in the camera body 81 and the like. Since the viscosity of the lubricant varies according to variation in temperature, the above described inertia therein also varies. Therefore, as is similar to the voltage correction coefficients, it is preferable to obtain temperature correction coefficients to compensate the variation of the temperature. The coefficients are stored in the memory means 101a for instance, as a $T_{KK}$ table.

Figure 12:
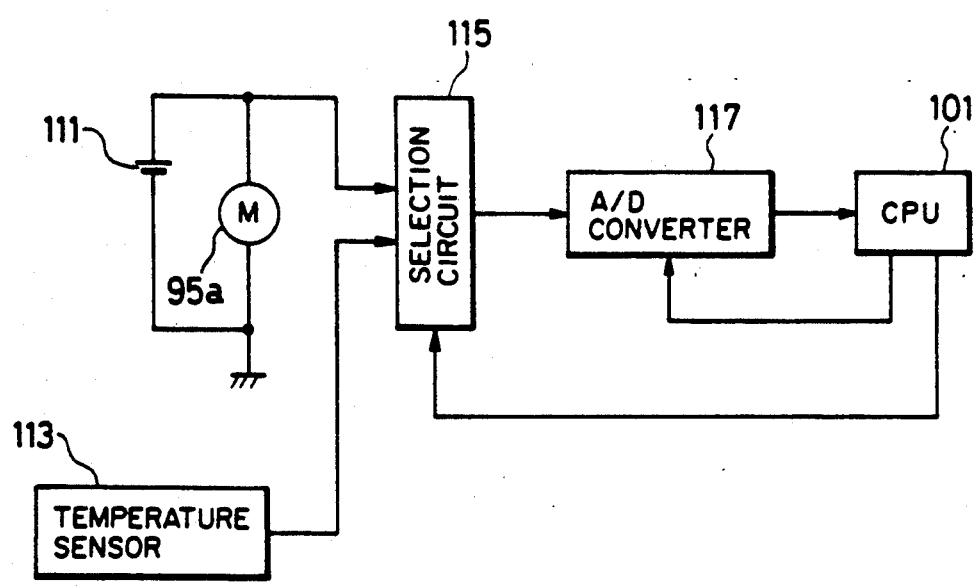
FIG. 12 is a block diagram showing an example of a circuit for detecting the voltage level of the battery and for measuring the temperature.

FIG. 12 is a block diagram showing an example of a circuit for detecting the voltage level of the battery and for measuring the temperature. In FIG. 12, reference numeral 111 denotes a battery; 113, a temperature sensor; 115, a selection circuit; and 117, an A/D converter. The voltage which is applied to the AF motor 95a by the battery 111, is applied to terminals of the selection circuit 115 simultaneously. The output of the temperature sensor 113 is also applied to the selection circuit 115. The selection circuit 115 operates to output to the A/D converter 117 either one of the output indicating the voltage level or the output indicating the temperature in response to an instruction signal from the CPU 101. The output from the selection circuit 115 is subjected to A/D conversion in the A/D converter 117 to be applied to the CPU 101. In the CPU 101, an aimed coefficient (Voltage or Temperature) is read out from its Table in response to the output signal from the converter 117.

Another correction coefficient may be used to improve the focusing accuracy and efficiency. An example of the coefficient is to compensate for differences of motor characteristics, which are manufactured in different manufacturing lines.

The operation of the focusing device provided with the above described speed changing device according to the invention will be described with reference to FIGS. 3(A) and 3(B). FIG. 3(B) is a flow chart showing the operation of the speed changing device.

A photographing operation in an automatic focusing mode is manually or automatically selected (Step 201).

In the image pickup section 91, a part of the light beam which passes through the photographing lens 51 (cf FIG. 2) is subjected to integration operation. The data (output signal) of the CCD is applied to the integration time comparison means 93a in the CPU 93 and to the arithmetic means 101b in the CPU 101. The arithmetic means 101b calculates an initial amount of defocusing D (Step 202). If the defocusing amount D is large, then the number of motor drive pulses corresponding to the amount of drive of the lens to the focused position may be often incorrect. In the embodiment, the amount of defocusing is obtained according to the correlation method (phase difference system). The method is based on the fact that the distance between the images formed respectively on a reference CCD and a comparison CCD in the image pickup section 91 is substantially proportional to the amount of defocusing; however, the detailed description of the method will be omitted, because the method is well known in the art.

Next, it is determined whether or not the amount of defocusing D obtained in the step 202 is effective as a value for determining the number of motor drive pulses (hereinafter referred to as "a motor drive pulse number", when applicable) P (Step 203). One example of this determination method will be described with reference to FIGS. 4(A), 4(B) and 4(C).

Figure 4A:
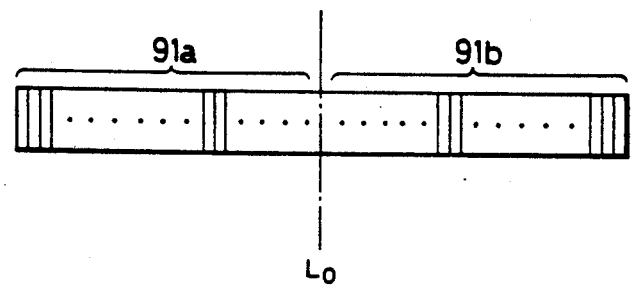
FIGS. 4(A), 4(B) and 4(C) are explanatory diagrams for a description as to the principle of focusing operation in an automatic focusing device according to the present invention.
Figure 4B:
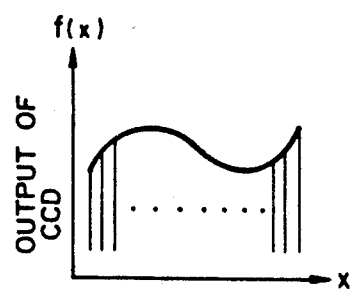
Figure 4C:
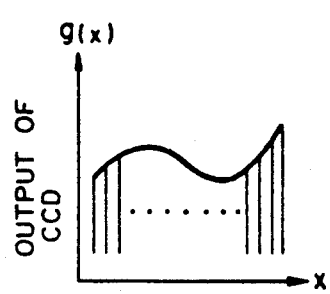
Figure 3:
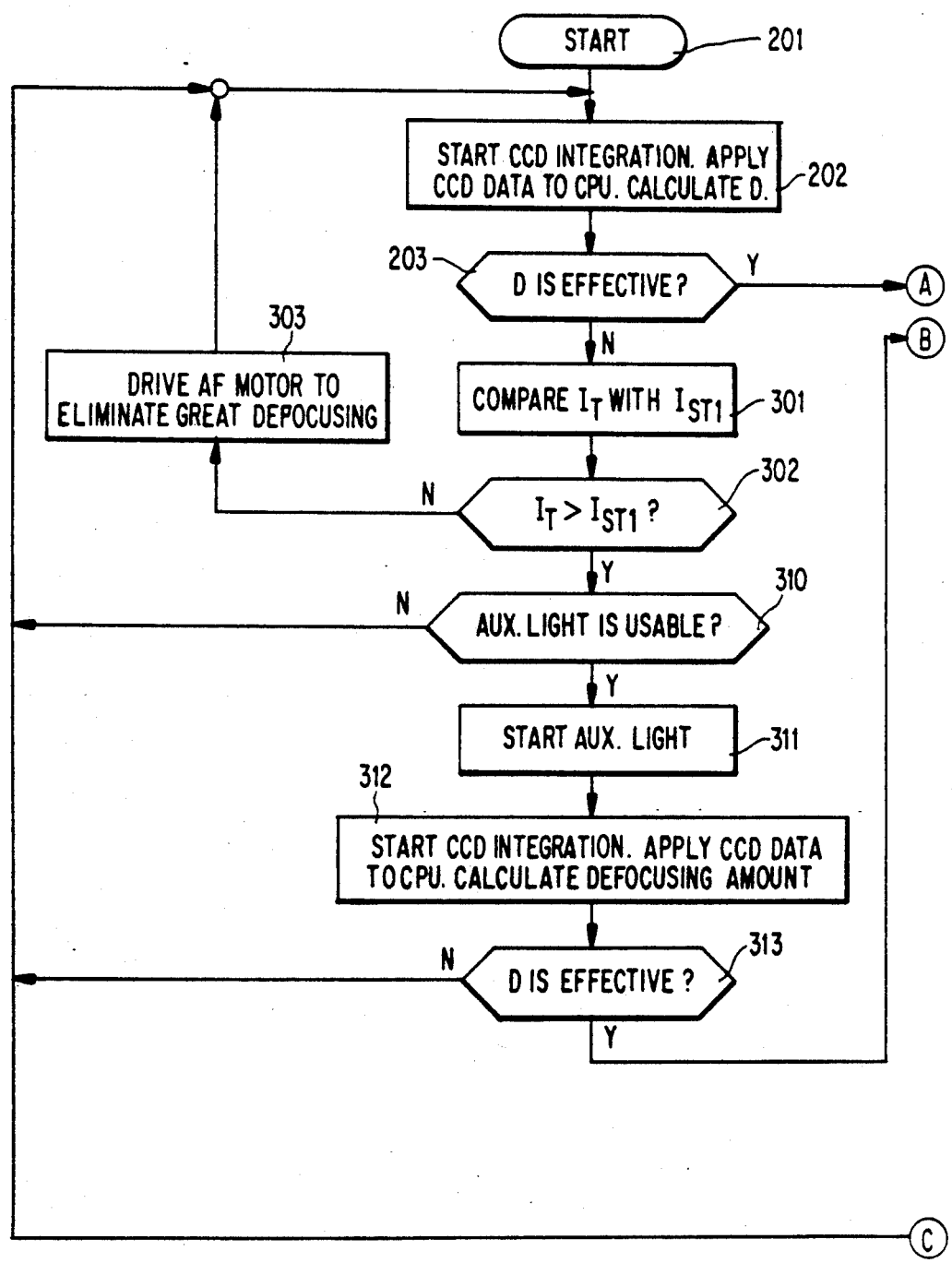
FIGS. 3(Ba) and 3(Bb) are flow charts showing a first embodiment of the operation of the focusing device according to the present invention.
Figure 3:
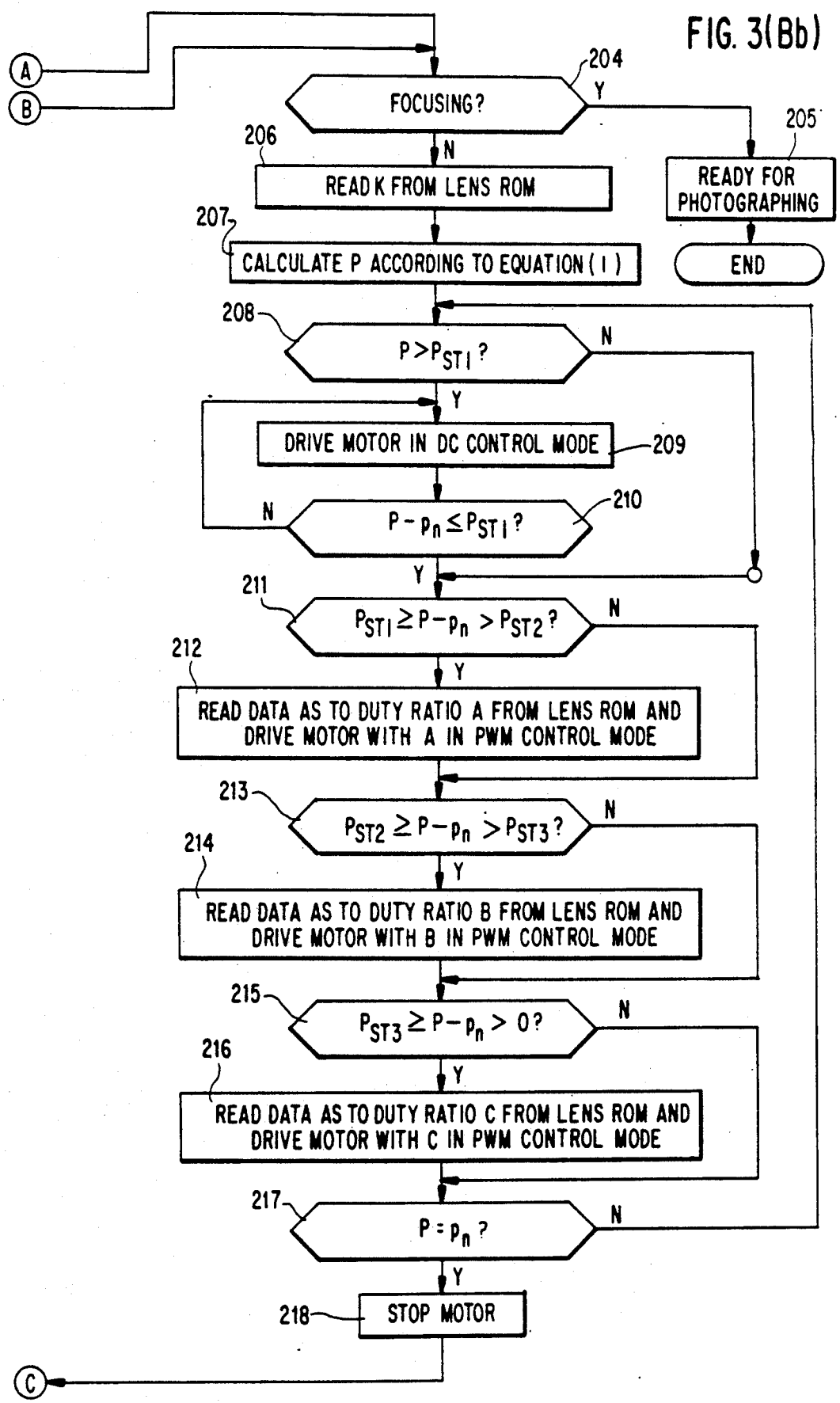

In FIG. 4(A), reference numerals 91a and 91b designates the reference CCD and the comparison CCD of the image pickup section 91, respectively. A light beam from an object is applied to both the CCDs 91a and 91b; that is, the image of the object is formed on the CCDs 91a and 91b so that the CCDs provide output signals. FIGS. 4(B) and 4(C) are characteristic diagrams showing the output signals of the CCDs 91a and 91b, respectively.

As described before, the output signals of the CCDs are applied to the arithmetic means 101b in the CPU 101. The arithmetic means 101b uses the output signals to calculate a contrast $y_1$ from the following equation (a):

$$y_1 = \int |(d/dx) f(x)| dx \qquad (a)$$

In addition, a correlation calculation is carried out according to the following equation (b):

$$y_2 \int |f(x) - g(x-t)| dt \qquad (b)$$

where t is the amount of lateral shift on the CCD sensor.

Next, the comparison means 101c of the CPU 101 compares the contrast $y_1$ thus obtained with a reference value $C_1$ stored in the memory means 101a of the CPU 101. Furthermore, the minimum value $y_2(t_{min})$ of the correlation calculation $y_2$ is compared with a reference value $C_2$ stored in the memory means 101a of the CPU 101. Moreover, the absolute value of the differential value $dy_2/dx$ of the value $y_2$ at the focusing point which is obtained according to the equation (b), is compared with a reference value stored in the memory means 101a of the CPU 101. When the results of these comparison satisfy the following expressions (1), (2) and (3), it is determined that the amount of defocusing D in question is effective:

$$Y_1 > C_1 \qquad (1)$$

$$Y_2(t_{min}) < C_2 \qquad (2)$$

$$|dy_2/dx \oplus > C_3 \qquad (3)$$

In the case where the amount of defocusing D is effective, it is determined whether or not the lens is focused on the object (Step 204). This determination is carried out by the arithmetic means 101b and the comparison means 101c of the CPU 101 for instance in the following manner: Assuming that the amount of lateral shift t when focusing is obtained is expressed as $t_0$, when a value of $|t_{min} - t_0|$ where $t_{min}$ is the value obtained according to the above-described equation (b), is smaller than a reference value $t_s$ stored in the memory means 101a, it is determined that the lens is focused on the object. When it is determined that the lens is focused on the object, the photographing preparatory operation is ended (Step 205).

In the case when the amount of defocusing D is effective but the lens is not focused on the object yet, the movable lens 53 (FIG. 2) is moved to the focused position.

The coefficient K is inputted from the lens ROM 57 of the photographing lens 51 into the arithmetic means 101b of the CPU 101. In case of using the equation (3), the coefficients $K_1$ and $K_2$ are inputted from the lens ROM 57 of the photographing lens 51 into the arithmetic means 101b of the CPU 101.

The coefficient K and the amount of defocusing D are used to obtain the pulse count value P of the encoder, which corresponds to the amount and the direction of drive of the movable lens to the focused position, according to the equation (1) (in case of reading both $K_1$ and $K_2$, according to the equation (3)) (Step 207).

Thereafter, while the AF motor 95a rotates in the correct direction based on the defocusing direction, the pulse count value $p_n$ is calculated. The counting operation can be carried out by an ordinary counter in the PCU 93, the CPU 101 or the like.

During the AF motor 95a being driven, the drive force of the motor 95a is transmitted through the clutch 95c on the body side and the clutch 55a on the lens side to the movable lens 53 to move the latter 53 to the focused position.

In this embodiment, the drive method of the AF motor 95a is changed in response to the amount of defocusing D as follows: First, in the comparison means 101c, the pulse count value P obtained from the equation (1) is compared with a reference pulse count value $P_{ST1}$ stored in the memory means 101a of the CPU 101 in advance (Step 208), and the result of comparison is applied to the switching means 93b of the PCU 93. When $P > P_{ST1}$ (the defocusing amount being large), the switching means 93b selects the DC control mode so that the AF motor 95a rotates at a constant high speed (Steps 208, 209). On the other hand, when $P \leq P_{ST1}$, the AF motor 95a is driven in the PWM control mode to move the lens gradually (steps 210 to 218).

In the DC control mode or the PWM control mode, the total pulse count value pn corresponding to the rotation amount of the motor is always detected. When the difference $(P - p_n)$ between the initial drive pulse count value P and the total pulse count value pn from the start of rotation is equal to or smaller than $P_{ST}$ $\{(P - p_n) \leq P_{ST1}\}$, the operation mode of the AF motor is changed to the PWM control mode (Step 210).

In the PWM control mode, the $(P - p_n)$ is always compared with a plurality of reference values stored in the memory means in advance such as $P_{st1}$, $P_{st2}$, $P_{st3}$, respectively, where $P_{st1} > P_{st2} > P_{st3}$, in the comparing means 101c. The number Of reference values are not limited to three but the number thereof can be set voluntarily.

As a result, the following different three operations are selectively carried out.

(a) In case of $P_{ST1} \geq (P - pn) > P_{ST2}$, the AF motor 95a is driven in the PWM control mode with a duty ratio of A (steps 211, 212);

(b) In case of $P_{ST2} \geq (P - pn) > P_{ST3}$, the AF motor 95a is driven in the PWM control mode with a duty ration of B (steps 213, 214); and (c) In case of $P_{ST3} \geq (P - pn) > 0$, the AF motor 95a is driven in the PWM control mode with a duty ratio of C (steps 215, 216), where the movement speed of the lens with the duty ratio of A is fastest and that with the duty ratio of C is slowest.

Data as to the above duty ratios has been stored at certain addresses in the lens ROM 57, and the CPU 101 operates to read the data in the following manner.

The CPU 101 operates to output to the lens ROM 57 both a signal for setting the PWM control bit to "1" and a two-bit signal representing the result of the above comparisons (a) to (c). One address is assigned by the above two signals and then the data stored at the address, which represents the duty ratio corresponding to the result of the comparison is applied to the CPU 101. Thereafter, the data is also applied to the PCU 93 so that the AF motor is driven with the selected duty ratio.

Accordingly, as the movable lens 53 approaches the focused position, the movement speed of the lens 53 decreases. Subsequently, when $P = p_n$ is obtained, the motor 53 is stopped and the movement of the focusing lens is completed (steps 217, 218).

Due to this control method, when the amount of defocusing D is large, the lens can be moved quickly; whereas when the amount of defocusing D is small, the lens can be moved delicately. Thus, the automatic focusing operation is excellent both in accuracy and in efficiency.

Let us consider the case where, in Step 203, the amount of defocusing D is determined ineffective. This may occur when an object having substantially no contrast is photographed or the amount of defocusing D is considerably large (the image being greatly foggy).

In this case, in the comparison means 101c, the integration time $I_T$ of the CCD sensor is compared with a reference integration time $I_{ST}$ stored in the memory means 101a (Step 301). When $I_T \leq I_{ST}$ and the amount of defocusing is ineffective although data is supplied to the CCD sensor, it is determined that the lens is greatly defocused, and so and the AF motor 95 is driven to change the position of the movable lens 53 (Steps 302 and 303). In this operation, the direction of rotation of the motor is changed to make the amount of defocusing $D_0$ effective; that is, the direction of rotation in which the amount of defocusing D can be made effective, can be found.

In the case where the value D is ineffective although $I_T > I_{ST}$, it is determined that an object substantially zero in contrast is photographed, and therefore an auxiliary light projecting device is used to give contrast to the object (Steps 310 and 311). The auxiliary light projecting device operates to produce a light beam having a certain pattern such as a zebra pattern. Thereafter, the integration operation of the CCD sensor is started, and the calculation of the amount of defocusing D and the determination of the effectiveness or ineffectiveness of the value D are carried out in the same manner as described above (Steps 312 and 313). Subsequently, in case of being effective in the step 313, the operation is returned to the step 204. On the other hand, in case of being ineffective, the operation is returned to the initial step 202.

A second embodiment of the focusing operation of the present invention in which the coefficient K is variable according to the advancement position of the movable lens 53 will be described with reference to FIGS. 6(A) to 6(G) showing a flow chart thereof.

In the second embodiment, a plurality of coefficients $K_{io}$ to $K_{im}$ which are determined in correspondence with a plurality of advancement positions of the movable lens 53, are stored in advance at addresses of the lens ROM 57 of the photographing lens 51.

The various lens shows a variety of variations between the advancement positions thereof and the coefficients, and thus the number of coefficients is selected suitably in each of various photographing lenses.

The reading operation for reading the coefficients stored in the lens ROM 57 is carried out by such a distance code plate 61 as shown in FIG. 5(A).

As the movable lens 53 moves, the distance ring of the code plate 61 rotates so that the brush member provided to the distance ring slidably contacts with the wiring pattern $a_1$ to $a_4$ shown in FIG. 5(A). With the distance code plate of FIG. 5(A), four different coupling condition between the brush and the wiring pattern are obtained at positions $Z_1$ and $Z_4$ to produce four output signals for addressing the lens ROM 57. The coefficient $K_i$ is read out from the address of the lens ROM 57 assigned by the output signal.

In the first embodiment, the movement of the movable lens 53 is controlled by detecting whether the movable lens 53 is driven for the amount of drive P. The detection is carried out by observing the total number of pulses $P_n$ which is counted totally from the start of movement of the movable lens 53 and then detecting whether the total number of pulses $P_n$ becomes equal to the aimed P. On the other hand, in this second embodiment, the detection operation is accomplished by the steps of setting the amount of drive P to a decremental counter, subtracting the number of pulses of an output signal from an encoder from the set value, and detecting whether the result of subtracting becomes zero.

Figure 5B:
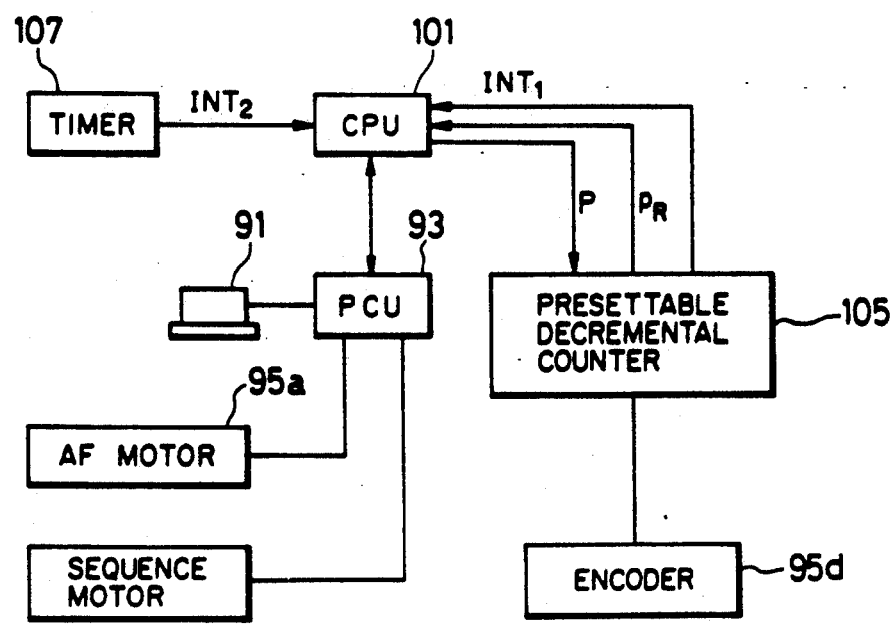
FIG. 5(B) is a block diagram showing an example of a circuit for controlling an amount of drive P.

FIG. 5(B) is a block diagram showing an example of a device for driving the movable lens 53 according to the amount of drive P.

In FIG. 5(B), reference numeral 105 denotes the above-described presentable decremental counter. As described above, set to the counter 105 is an amount of drive P for the movable lens 53 which is obtained by the calculation in the CPU 105. The counter 105 has a sufficient capacity, so as to meet with a relatively large amount of drive, which is required in case of large defocusing or in case of using a lens system necessary for the large amount of drive. As shown in FIG. 5(B), the counter 105 receives an output pulse signal from the encoder 95d. In the counter 105, the number of pulses of the output signal from the encoder 95d is subtracted from the amount of drive P thus set to apply an output signal representing the result of the subtraction to the following CPU 101. Further, the counter 105 operates to output an interruption signal $INT_1$ when the result of subtraction becomes zero. Upon receipt of the interruption signal $INT_1$, the CPU 101 produces an output signal through the PCU 93 to the rotation of the motor 95a, and further the CPU 101 operates to prevent an application of the signal $INT_1$ until the interruption is next allowed (see FIG. 6(C) showing a flow chart for the $INT_1$).

A timer 107 operates to produce another interruption signal $INT_2$ to the CPU 101 each $1 \times 10^{-3}$ sec (1 msec) for instance. When the interruption $INT_2$ is allowed, upon the reception of such an interruption signal $INT_2$, the CPU 101 operates to compare the output of the counter 105 representing the remaining amount of drive $P_R$ with the reference pulse number $P_{ST}$ stored in the memory means 101a. In case of $P_R \leq P_{ST}$, the CPU 101 controls the AF motor 95a to be driven in the PWM control mode and operates to prevent the input of the interruption signal $INT_2$ (see FIG. 6(D) showing a flow chart for the $INT_2$). In this case, it is preferable in the PWM control mode to control the duty ration of the drive pulse signal so as to decrease the movement speed of the movable lens 53 as the remaining amount of drive $p_R$ decreases.

In the case where the amount of defocusing is ineffective in the first embodiment of the present invention, the operation steps 301 to 313 shown in FIG. 3(B) are carried out. But in the second embodiment, in order to make the amount of defocusing D effective rapidly, the operation steps shown in FIG. 6(E) to 6(G) are carried out.

The following is the detailed description of the second embodiment with reference to FIGS. 3(A), 5(B), and 6(A) to 6(G). In this case, it should be noted that the amount of defocusing D is obtained by the equation (1).

Figure 6A:
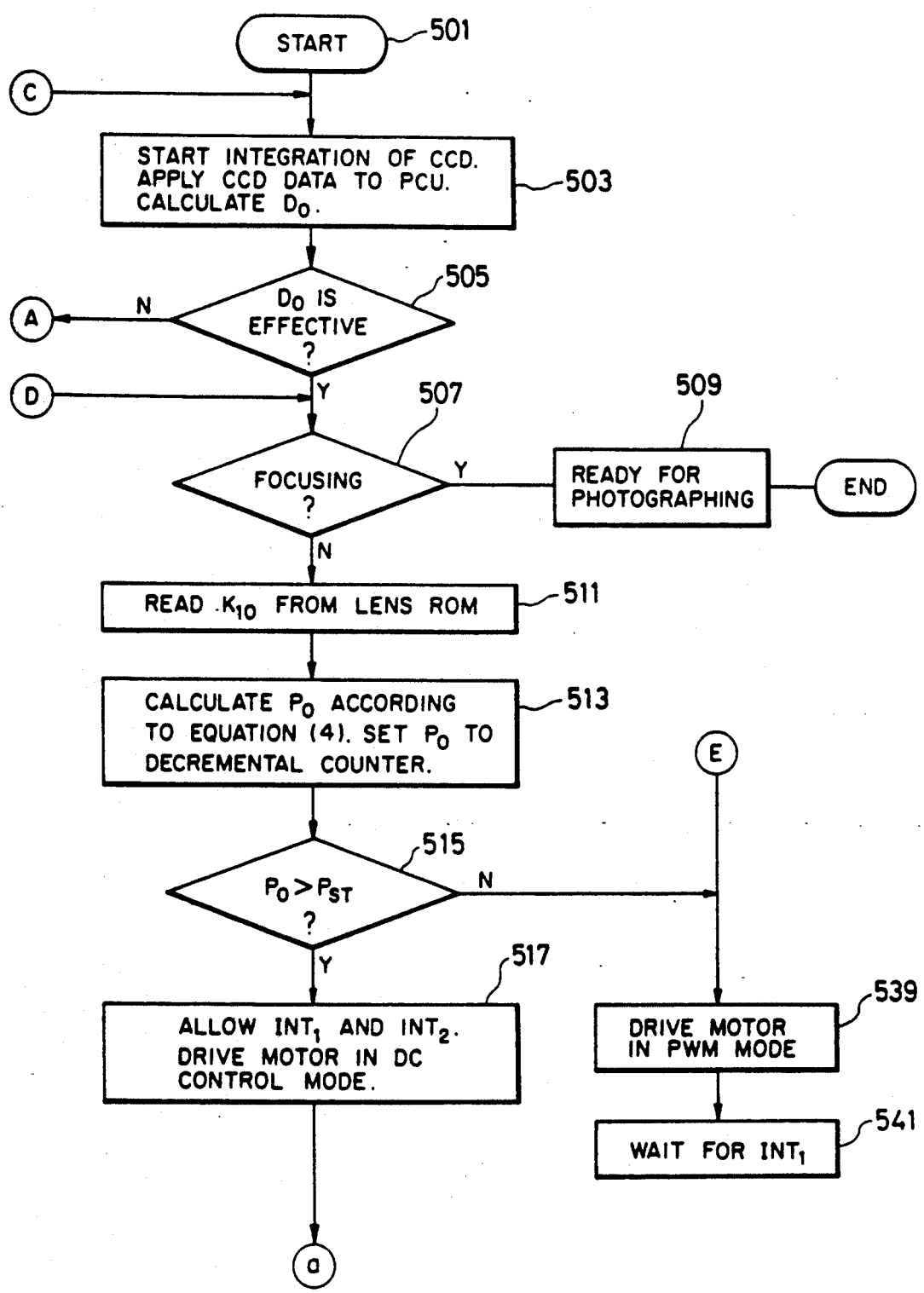

As is similar to the first embodiment, the calculation of the defocusing amount $D_0$ and the evaluation of the thus obtained defocusing amount $D_0$ are first carried out in this order (Steps 501 to 505 of FIG. 6(A)). In case of the defocusing amount $D_0$ being ineffective, the operation advances to the operation flow shown in FIGS. 6(E) to 6(G), which will be described in detail hereinafter.

On the other hand, when it is detected in the step 505 that the defocusing amount $D_0$ is effective, the operation advances to the following steps 507 where it is determined whether the focusing is obtained or not. Then, in case of the focusing being obtained, the operation advances to the steps 507 and 509 where it is informed to the photographer that the preparation of photography has been completed.

In the case where the defocusing amount $D_0$ is effective but the focusing is not obtained, lens movement coefficient $K_{1n}$ which corresponds to the present lens advancement position of the movable lens 53, is read out from the lens ROM 57. This reading operation is carried out by the use of the distance plate 61 as described hereinbefore. The coefficient which is referred to as $K_{10}$ is applied to the arithmetic means 101b of the CPU 101 in the step 511.

The coefficient $K_{10}$ corresponds to the coefficient $K_1$ in the equation (1). Thus, the arithmetic means 101b calculates the pulse count value $P_0$ of the encoder 95d, which represents the amount of drive from the present lens position to the focused position, according to the equation (1). In this example, the thus obtained $P_0$ is set to the presentable decremental counter 105 shown in FIG. 5(B) in the step 513.

As is similar to the first embodiment, the driving method of the AF motor 95a is changed, according to the focusing condition whether the defocusing amount $D_0$ is relatively larger or not, as follows: First, in the comparison means 101c, the pulse count value $P_0$ obtained according to the equation (1) is compared with a reference pulse count value $P_{st1}$ stored in the memory means 101a of the CPU 101, and the result of comparison is applied to the switching means 93b of the PCU 93 (Step 515).

When $P_0 \leq P_{ST1}$ in the step 515, the PCU 93 controls the AF motor 95a to be driven in the PWM control mode (step 539). In the PWM control mode, the comparing means 101c of the CPU 101 operates to periodically (every 1 msec for instance) compare the count value of the decremental counter 105 representing the remaining amount of drive $p_R$ with the plural reference values stored in the memory means in advance. Then, the CPU 101 waits for receiving the interruption signal $INT_1$.

When the CPU 101 receives the interruption signal $INT_1$ during the motor being driven in the PWM control mode (step 543), as shown in FIG. 6(C), the CPU 101 operates to produce an instruction signal to the PCU 93 to stop the AF motor 95a. Further, the CPU 101 operates to prevent the reception of the interruption $INT_1$ until the $INT_1$ being next allowed (step 547). Thereafter, the operation is returned to the step 503 shown in FIG. 6(A).

On the other hand, when $P_0 > P_{ST1}$ in the step 515, the CPU 101 operates to allow both the interruptions $INT_1$ and $INT_2$. The PCU 93 controls the AF motor 95a in the DC control mode so that the motor 95a is driven at a constant high speed (Step 517). In this case, because of both $INT_1$ and $INT_2$ being allowed, even in the motor driving operation in the DC control mode, when the CPU 101 receives the $INT_1$, the operation is allowed to advance to the steps 543 to 547 shown in FIG. 6(C), and then returned to the step 503. Further, the remaining amount of drive $p_R$ for the AF motor 95a, which is produced by the decremental counter 105, is compared with the reference pulse value $P_{ST1}$ each 1 msec for instance (Steps 549 and 551).

As shown in FIG. 6(D), when $p_R \leq P_{ST1}$ in the step 551, the interruption $INT_2$ is prevented (Step 553), and then the AF motor 95a is driven in the PWM control mode (step 561).

The AF motor 95a is driven in the above-described manner. Therefore, when the amount of defocusing $D_0$ is relatively small, the lens can be moved delicately. On the other hand, when the amount of defocusing $D_0$ is relatively large, the lens can be moved at the high speed. Thus, the automatic focusing operation is excellent both in accuracy and in efficiency.

Figure 7:
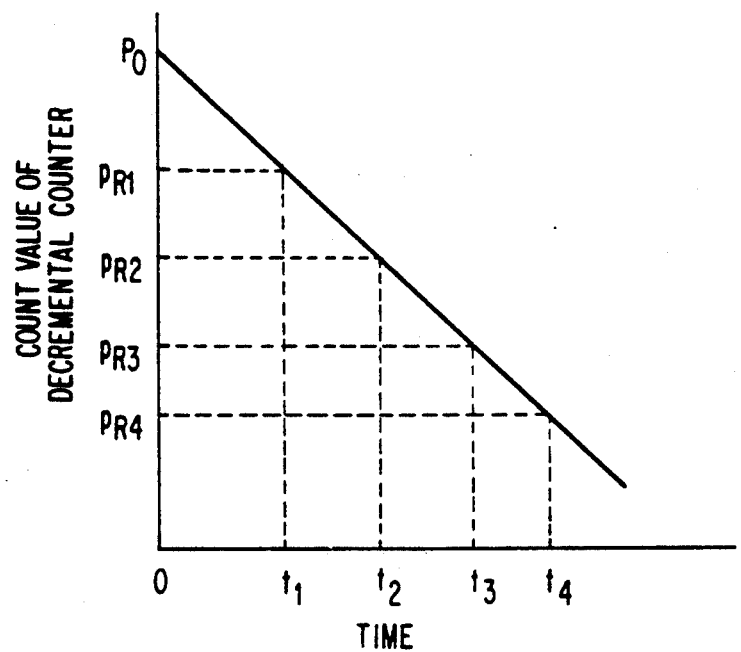
FIG. 7 is an explanatory diagram for a description as to the principle of obtaining the new amount of drive $P_z$.

While the AF motor 95a is driven in the DC control mode, the movable lens 53 is moved towards the focusing position at a constant speed. In the constant speed movement of the movable lens, an operation for obtaining a new amount of drive $P_Z$ for controlling the motor 95a in order to move the lens 53 to the focused position, is continuously carried out. FIG. 7 is an explanatory diagram for a description a to the principle of obtaining the new amount of drive $P_Z$. In FIG. 7, the vertical axis indicates an output of the decremental counter 105.

Figure 6B:
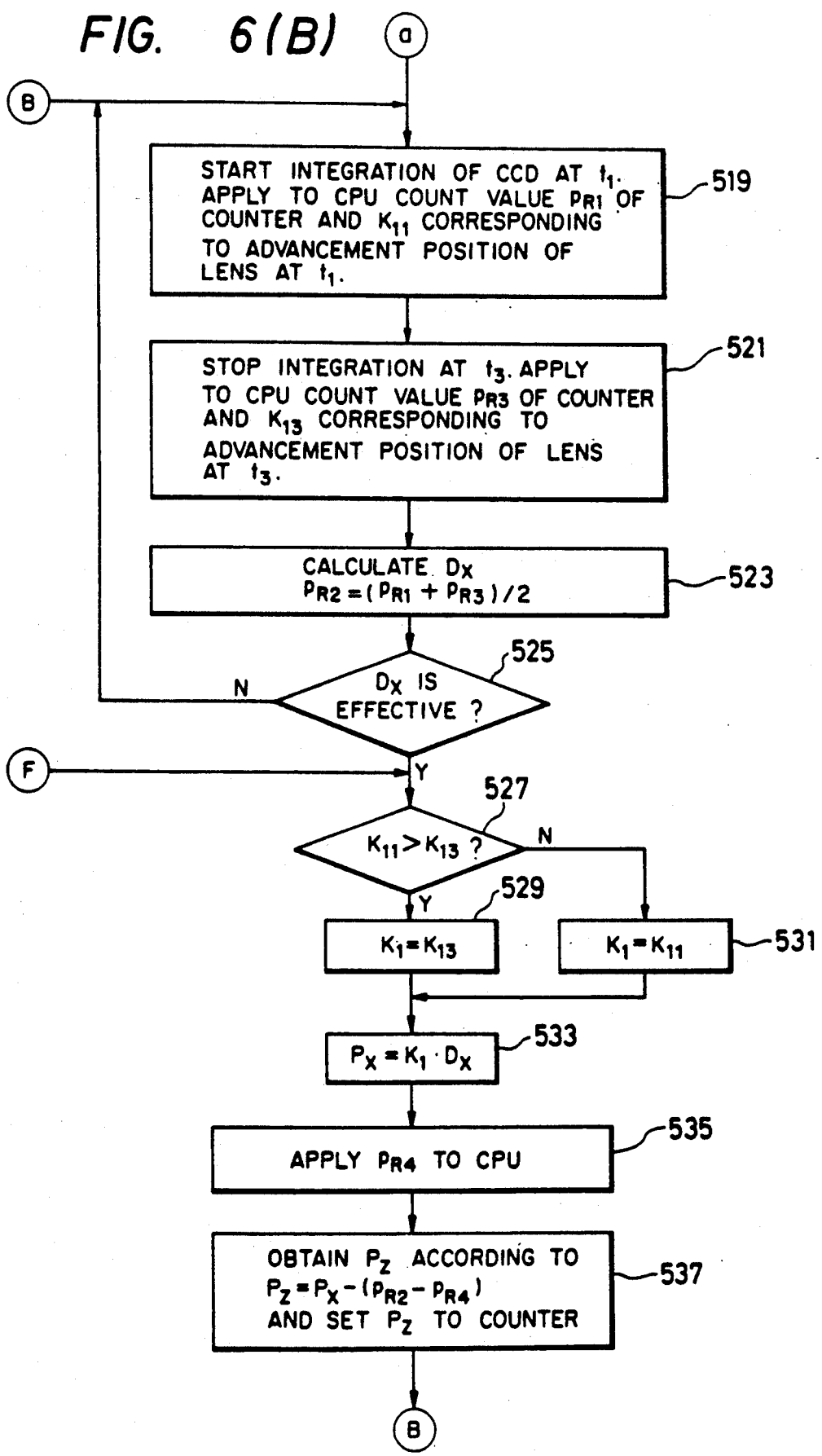
Figure 6C:
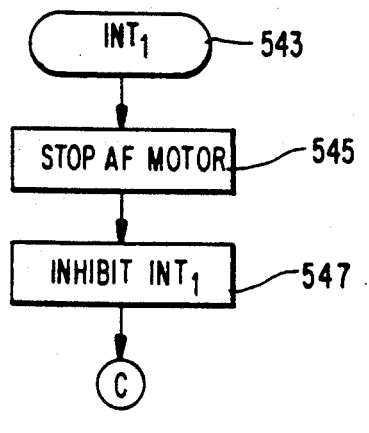
Figure 6D:
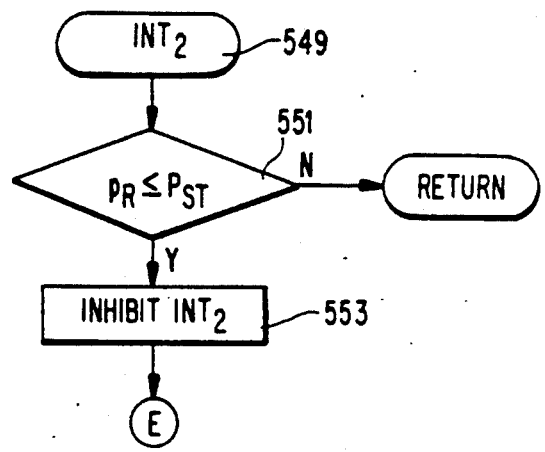
Figure 6E:
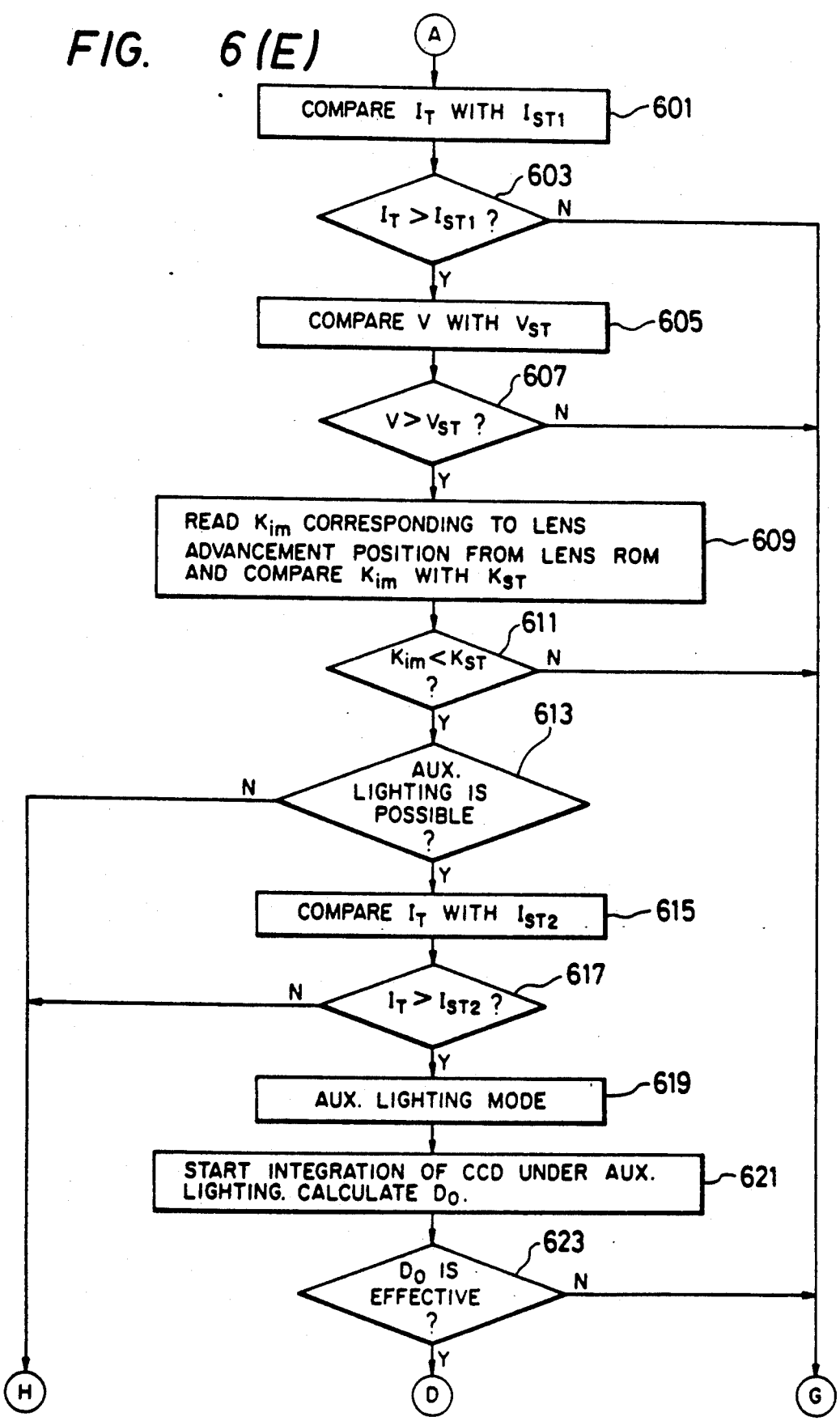

First, as shown in FIG. 6(B), at a time instant $t_1$ during the constant speed movement of the movable lens 53, the integration operation of the CCD sensor of the image pickup section 91 is started. The pulse count value $p_{R1}$ of the decremental counter 105 at the time instant $t_1$ and coefficient $K_{11}$ corresponding to the advancement position of the movable lens 53 at the time instant $t_1$ are applied to the memory means 101a of the CPU 101 (step 519). At a time instant $t_3$ after the lapse of a period of time long enough to allow the CCD sensor to receive a predetermined quantity of light, the integration operation of the CCD sensor is suspended. For the period of time $(t_3 - t_1)$, the movable lens 53 is being moved, and therefore the pulse count value of the counter 105 is decreased to $p_{R3}$ from $p_{R1}$. The value $p_{R3}$ and coefficient $K_{13}$ corresponding to the advancement position at the time instant $t_3$ are input to the memory means 101a of the CPU 101. In addition, the data provided by the CCD sensor for the period of time $(t_3 - t_1)$ is applied to the PCU 93 (step 521).

As is similar to the calculation of the amount of defocusing in the step 503, an amount of defocusing $D_X$ is calculated according to the data provided by the image pickup section 91 for the period of time $(t_3 - t_1)$. The value $D_X$ thus calculated may be regarded as an amount of defocusing at the middle of the period of time $(t_3 - t_1)$; i.e., at a time instant $t_2$. In the arithmetic means 101b, the pulse count value $p_{R2}$ at the time instant $t_2$ is calculated from the following equation (step 523):

$$p_{R2} = (p_{R1} + p_{R3})/2$$

In the following step 525, it is determined in the same manner in the step 505 whether the defocusing amount $D_X$ which is obtained in the step 523 is effective or not. In case of being ineffective, the operation is returned to the step 519.

In case of being effective, the comparison of $K_{11}$ and $K_{13}$ is carried out in the comparison means 101c of the CPU 101 in the step 527. As a result, in case of $K_{11} > K_{13}$, the coefficient $K_{13}$ is used as $K_1$ in the step 529. On the other hand, in Case of $K_{11} \leq K_{13}$, the coefficient $K_{11}$ is used as $K_1$ in the step 531. By selecting the smaller coefficient $K_1$, an occurrence of overrun of the movable lens with respect to the focused position is avoided.

In the arithmetic means 101b, the value $D_X$ is used to obtain the number of pulses $P_x$ so as to move the lens 53 from its position at the time instant $t_2$ to the focused position according to equation (1) described above (step 533).

On the other hand, the movable lens 53 is moved on and thus the count value of the decremental counter 105 is decreased, even while the values $D_X$, $p_{R2}$ and $P_X$ is being calculated. Therefore, at the time instant $t_4$ when the value $P_X$ has been calculated, the count value of the decremental counter 105 is decreased to $p_{R4}$ from $p_{R3}$. The value $p_{R4}$ is applied to the memory means 101a to be stored therein (step 535).

Thereafter, based on the values $P_X$, $p_{R2}$ and $p_{R4}$, the arithmetic means 101b operates to obtain the number of pulses $P_Z$ required for moving the movable lens 53 from its position at the time instant $t_4$ to the focused position according to the following equation (4) (step 537):

$$P_Z = P_X - (p_{R2} - p_{R4}) \qquad (4)$$

After the new amount of drive $P_Z$ is newly set to the decremental counter 105 in the step 537, the operation is returned to the step 519. Then, the operations in the steps 519 to 537 are carried out repeatedly. These operations in the steps 519 to 537 are carried out cyclically. During these cyclical operations of the steps 519 to 537, if either the interruption signal $INT_1$ or $INT_2$ is received by the CPU 101, the operation skips to either the step 543 shown in FIG. 6(C) or the step 549 shown in FIG. 6(D).

Due to the new amount of drive $P_Z$, the accuracy in focusing is improved when compared with the accuracy in focusing based on the prior amount of drive $P_0$. Further, due to the provision of the steps 527 to 531, it is possible to prevent such an occurrence of undesired overrun that the movable lens 53 overruns the focused position from either front-defocused position or rear-defocused position. In other words, it is possible to avoid undesired focusing operation such that the movable lens 53 is positioned at the focused position after the reciprocating movement thereof, which makes the photographer uncomfortable.

Although one of the coefficients $K_{11}$ and $K_{13}$, that is smaller than the other, is employed as a coefficient $K_1$ in the second embodiment, in case of using a lens system whose coefficient $K$ is variable according to lens advancement positions, modifications are possible without departing from this concept.

For example, assuming that the integration period of the CCD sensor is extremely short, the variation in the coefficient $K$ during this short period can be approximated linearly and the coefficient $K_{13}$ at the time instant $t_3$ is smaller than the others, a lens movement conversion coefficient $K_{im}$ may be determined as $K_{im} = (K_{11} + K_{13})/2$. In this case, it goes without saying that the focusing accuracy is also satisfactory.

It should be noted that even in case of using a lens system whose coefficient is made unchanged regardless of the advancement position of the movable lens 53, it is possible to obtain the constant coefficient $K$ according to the steps 527 to 531 shown in FIG. 6(B). Therefore, the calculation of $P_z$ can be obtained in the same manner as described above to thereby correct the amount of drive for the movable lens.

Next, in the case where an object having substantially no contrast is photographed or the movable lens 53 is extremely apart from the focused position (the image being greatly foggy), the amount of defocusing $D_0$ is determined ineffective in the step 505. Then, the operation advances to the step 601 shown in FIG. 6(E). The following operations will be described with reference to FIGS. 6(E) to 6(G).

In this case, the comparing means 101c of the CPU 101 outputs a signal representing the ineffectiveness of the amount of defocusing $D_0$ to the integration time comparison means 93a of the PCU. In response to the signal, the integration time $I_T$ of the CCD sensor is compared with a reference integration time $I_{ST1}$ read out from the memory means 101a in the comparison means 93a (steps 601 and 603). When in the step 603, it is determined that $I_T > I_{ST1}$ and thus the brightness of the object is insufficient, then a power source voltage V for driving the AF motor 95a is compared with a reference voltage value $V_{ST}$ which has been stored in the memory means 101a (steps 605, 607). This comparison is accomplished in view of the following reason. Assuming that the movable lens 53 is driven at a high speed in the DC control mode under the power source voltage V is relatively high, there may occur the overrun of the movable lens 53 during the image of the object being formed on the CCD sensor 91. This disadvantage can be avoided by controlling the drive of the AF motor 95 taking the result of the voltage comparison into consideration.

In case of $V \geq V_{ST}$ and using a lens system whose lens movement conversion coefficient is made unchanged with respect to the advancement position of the movable lens, the constant coefficient $K_{im}$ is read out from the lens ROM 57 to be applied to the CPU 101 (step 609). The coefficient $K_{im}$ is compared with a reference coefficient $K_{ST}$ which has been stored in the memory means 101a (step 611). This operation is also carried out in view of the above same reason.

As described above, since the coefficient represents the number of pulses per unit movement value of the image formed by the movable lens, in case of the coefficient $K_{im}$ being relatively small, it is likely to move the movable lens roughly. This may result in focusing with insufficient accuracy. In this case, it should be noted that, assuming that the coefficient K is defined by $1/K_{im}$, the large and small relation of the K value is inverted. This comparison is also carried out to improve the accuracy of focusing.

In the case where it is detected in the step 611 that the coefficient $K_{im}$ is smaller than the reference coefficient $K_{ST}$, it is confirmed whether the auxiliary light projecting device can be used or not (step 613). If yes, the operation advances to the step 615 where the integration time $I_T$ is compared, in the comparison means 101c, with a different reference integration period of time $I_{ST2}$ set longer than the prior $I_{ST1}$, which has been stored in the memory means 101a. This is carried out in order to detect brightness of the object.

In case of the $I_T$ is longer than the $I_{ST2}$, the focusing operation is carried out in the auxiliary light projecting operation mode (steps 617 and 619). Then, under the auxiliary light projection, the light reflected from the object is integrated to obtain the amount of defocusing $D_0$ (step 621). In the following step 623, the thus obtained defocusing amount $D_0$ is subjected to evaluation whether it is effective or not. In case of being effective, the operation is returned to the step 507 shown in FIG. 6(A).

On the other hand, in case of the defocusing amount $D_0$ being determined ineffective in the step 623, as is similar to the case where "No" is issued in the step 603, 607 or 611, the operation advances to an operation flow shown in FIG. 6(F).

In the step 624, the CPU 101 operates to allow both the interruptions $INT_1$ and $INT_2$, and further outputs an instruction signal so as to drive the AF motor 95a in the DC control mode. This DC control mode operation is carried out in the same manner as in the steps 517 to 523 shown in FIGS. 6(A) and 6(B) to obtain the amount of defocusing $D_0$ during the AF motor 95a being driven (steps 624 to 629). Subsequently, in the step 631, it is determined in the same manner as in the step 505 whether the thus obtained defocusing amount $D_0$ is effective or not. In case of being effective, the operation is returned to the step 527.

In case of being ineffective, it is detected whether the movable lens 53 has arrived at an end point in one movement direction thereof in the following step 633. When the movable lens 53 has not yet reached the end point and can be further advanced (or retracted), the operation is returned to the step 625.

On the other hand, upon detection of reaching the end point, the AF motor 95a is stopped in the step 635.

Then, it is confirmed whether the detection of the end point is the first time or not in the step 637. In case of the first time, the rotation of the AF motor 95a is reversed and the AF motor 95a is driven in the DC control mode in the step 639. Subsequently, the operation is returned to the step 625. On the other hand, in case of twice, the operation is returned to the initial step 503.

In the case where it is detected in the step 613 that the auxiliary light projecting device is usable or it is detected in the step 617 that $I_T \leq I_{ST2}$, the CPU 101 operates to allow both interruptions $INT_1$ and $INT_2$ and also operates to output an instruction signal to the PCU 93 so as to control the AF motor 95a in the PWM control mode (step 641 shown in FIG. 6(G)). This PWM control operation is carried out in the same manner as in the steps 517 to 523 in the steps 643 to 647. In the step 647, the new amount of defocusing $D_0$ is obtained. The new defocusing amount $D_0$ is subjected to the evaluation in the step 649, and then in case of being effective, the operation is returned to the step 527 shown in FIG. 6(B).

In case of being ineffective, it is confirmed whether the movable lens 53 has arrived at an end in one movement direction thereof (step 651). If "No" that is, if the movable lens 53 has not yet reach the end point and can be further advanced (or retracted), the operation is returned to the step 643. On the other hand, if "Yes", the AF motor 95a is stopped in the step 653. Then, it is confirmed in the step 655 whether the detection of the end point is the first time or not. In case of the first time, the rotation of the AF motor 95a is reversed and the AF motor 95a is driven in the PWM control mode (step 657). Thereafter, the operation is returned to the step 643. In case of twice, the operation is returned to the initial step 503.

In the above described focusing operation shown in FIGS. 6(E) to 6(G), the driving condition of the AF motor 95a for eliminating the ineffectiveness of the defocusing amount $D_0$ is taken into account, and therefore it is accelerated to make the defocusing amount $D_0$ effective.

The following is the third embodiment of the present invention using a lens system whose lens movement conversion coefficient K is variable according to the advancement position of the movable lens, and in which the amount of drive P is calculated according to the equation (2).

In this case, a plurality of coefficient pairs each including primary and secondary ones $K_{1m}$ and $K_{2m}$ which correspond to various advancement positions of the movable lens 53, respectively, are stored in the lens ROM 57 in advance. The coefficient pair which is stored in an address corresponding to the present lens advancement position of the lens ROM 57 is read out to calculate the amount of drive P according to the equation (2). The automatic focusing operation is substantially same as that of FIGS. 6(A) to 6(G) other than the steps 511 to 533 shown in FIGS. 6(A) and 6(B). Therefore, the different portion of the operation flow will be described with reference to FIG. 8 where the same steps as those in FIGS. 6(A) and 6(B) bear the same reference numerals.

In case of "No" in the step 507, the operation advances to the step 701 where a pair of $K_{1m}$ and $K_{2m}$ which correspond to the present lens advancement position are read out from the lens ROM 57 to the CPU 101, the coefficients $K_{1m}$ and $K_{2m}$ being referred to as $K_{10}$ and $K_{20}$. In the Step 703, the CPU 101 calculates the amount of drive $P_0$ according to the equation (2) based on the coefficients $K_{10}$ and $K_{20}$ and the defocusing amount $D_0$ which is obtained in the step 503. The thus obtained $P_0$ is then set to the decremental counter 105 (step 703).

In the following step 705, the comparison means 101c compares the drive amount $P_0$ with the reference pulse count value PST which has been stored in the memory means 101a of the CPU 101. In case of $P_0 \leq P_{ST}$, the AF motor 95a is driven in the PWM control mode, and the CPU 101 waits receiving the interruption signal $INT_1$ (steps 731 and 733). After reception of the interruption signal $INT_1$, the operation advances to the operation flow shown in FIG. 6(C).

In case of $P_0 > P_{ST}$ in the step 705, the CPU 101 allows both interruptions $INT_1$ and $INT_2$, and operates to an instruction signal to the PCU 93 so that the AF motor 95a is driven in the DC control mode (step 707). Because of the $INT_1$ and $INT_2$ being allowed, the CPU 101 skips the operation to the operation flow shown in FIG. 6(C) upon reception of the $INT_1$. Further upon reception of the $INT_2$, the count value $p_R$ of the decremental counter 105 is compared with the reference count value $P_{ST}$ every one second (step 551). When $p_R \leq P_{ST}$, the CPU 101 outputs an instruction signal to the PCU 93 so as to drive the AF motor 95a in the PWM control mode (step 539).

After the step 707, the integration of the CCD sensor is started at the time instant $t_1$ during the movable lens being driven at the constant speed. The count value $p_{R1}$ of the counter 105 at the time instant $t_1$ and the coefficients $K_{11}$ and $K_{21}$ corresponding to the advancement position of the movable lens at the time instant $t_1$ are input to the memory means 101a of the CPU 101 (step 709). Thereafter, at the time instant $t_3$ after a certain period of time has elapsed, which is necessary that the CCD sensor can receive the sufficient amount of light, the integration operation of the CCD sensor is suspended. Since the movable lens 53 moves continuously during period of time $(t_3-t_1)$, the count value of the counter 105 also decreases from $p_{R1}$ to $p_{R3}$ and the lens position is also changed. The count value $p_{R3}$ of the counter 105 at the time instant $t_3$ and the coefficients $K_{13}$ and $K_{23}$ corresponding to the advancement position of the movable lens at the time instant $t_3$ are written to the memory means 101a of the CPU 101. Further, the data obtained by the CCD sensor during the period of time $(t_3-t_1)$ is applied to the PCU 93 (step 711).

Next, the defocusing amount $D_X$ is calculated based on the data of the CCD sensor in the PCU 93. The defocusing amount $D_X$ is equivalent to that at the middle point $t_2$ of the period $(t_3-t_1)$. The arithmetic means 101b calculates the count value $p_{R2}$ from the equation $p_{R2}=(p_{R1}+p_{R3})/2$ (Step 713).

In the following step 715, it is determined in the same manner as that in the step 505 whether the defocusing amount $D_X$ obtained in the step 713 is effective or not. In case of being ineffective, the operation is returned to the step 709.

On the other hand, in case of being effective, the CPU 101 calculates the amount of drive $P_{X1}$ based on the defocusing amount $D_X$ and the coefficients $K_{11}$ and $K_{21}$ corresponding to the lens advancement position at the time instant $t_1$ according to the equation (2). In addition, the CPU 101 calculates the amount of drive $P_{X3}$ based on the defocusing amount $D_X$ and the coefficients $K_{13}$ and $K_{23}$ corresponding to the lens advancement position at the time instant $t_3$ according to the equation (2) (step 717). Subsequently, the comparison means 101c of the CPU 101 compares the thus obtained $P_{X1}$ and $p_{X3}$, as a result of which the smaller one is employed as the amount of drive $P_X$ (steps 719 to 723). After the step 723, the operation is returned to the step 535 shown in FIG. 6(B).

As is apparent from the above, in the above described embodiment, the amount of drive $P_Z$ is obtained according to the equation (2) including both primary and secondary coefficients, and therefore the movable lens 53 can be positioned closer to a real focused position when compared with the embodiments using the equation (1) including the primary coefficient only. Further, this embodiment has the same advantage as those in the other embodiment described above that the focusing is obtained without reciprocating movement of the movable lens with respect to the focused position. This results in eliminating uncomfortable feeling to the photographer during the focusing operation.

Figure 8A:
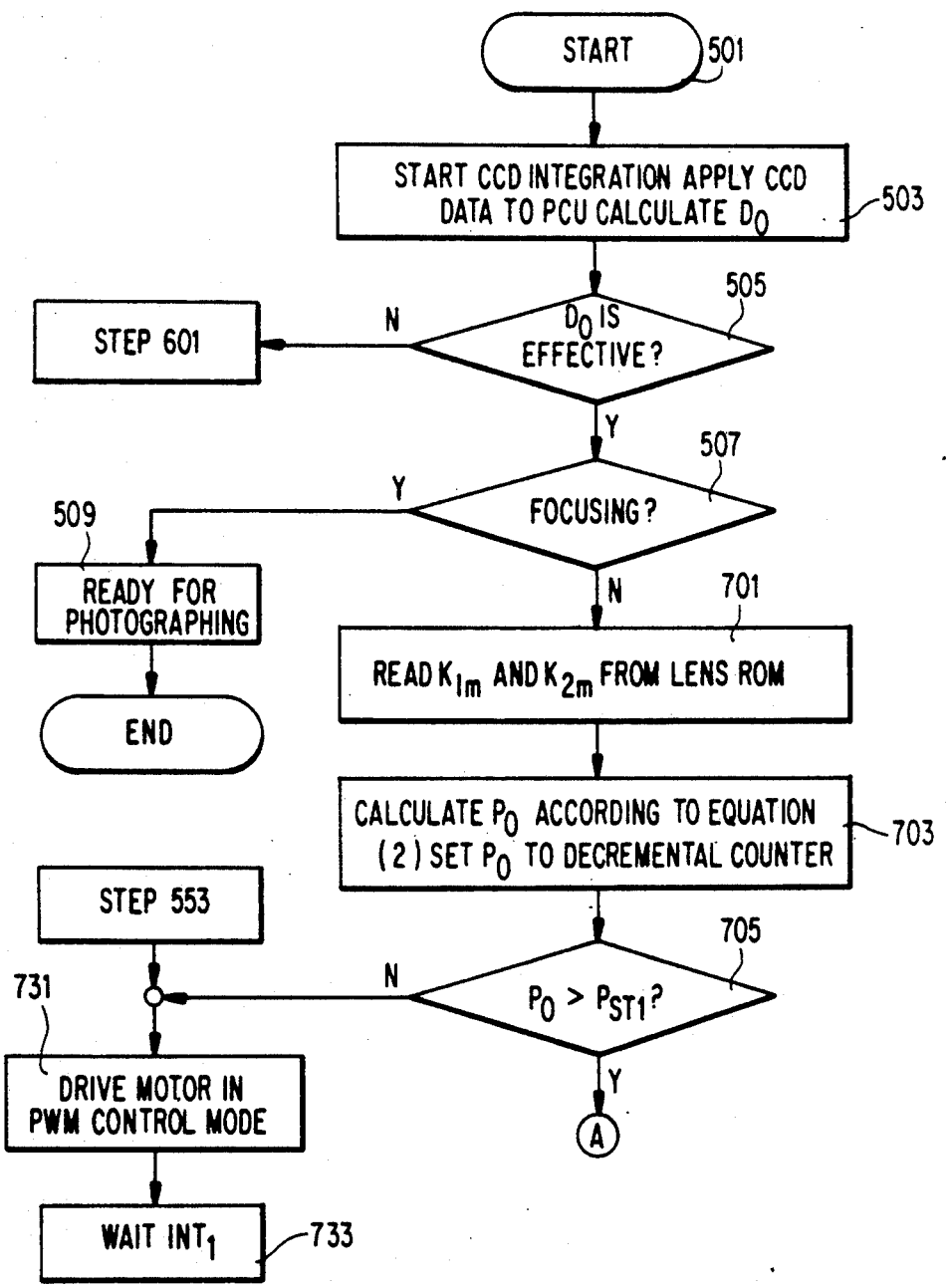
FIGS. 8a and 8b are flow charts showing a third embodiment of the operation of the focusing device according to the present invention.
Figure 8B:
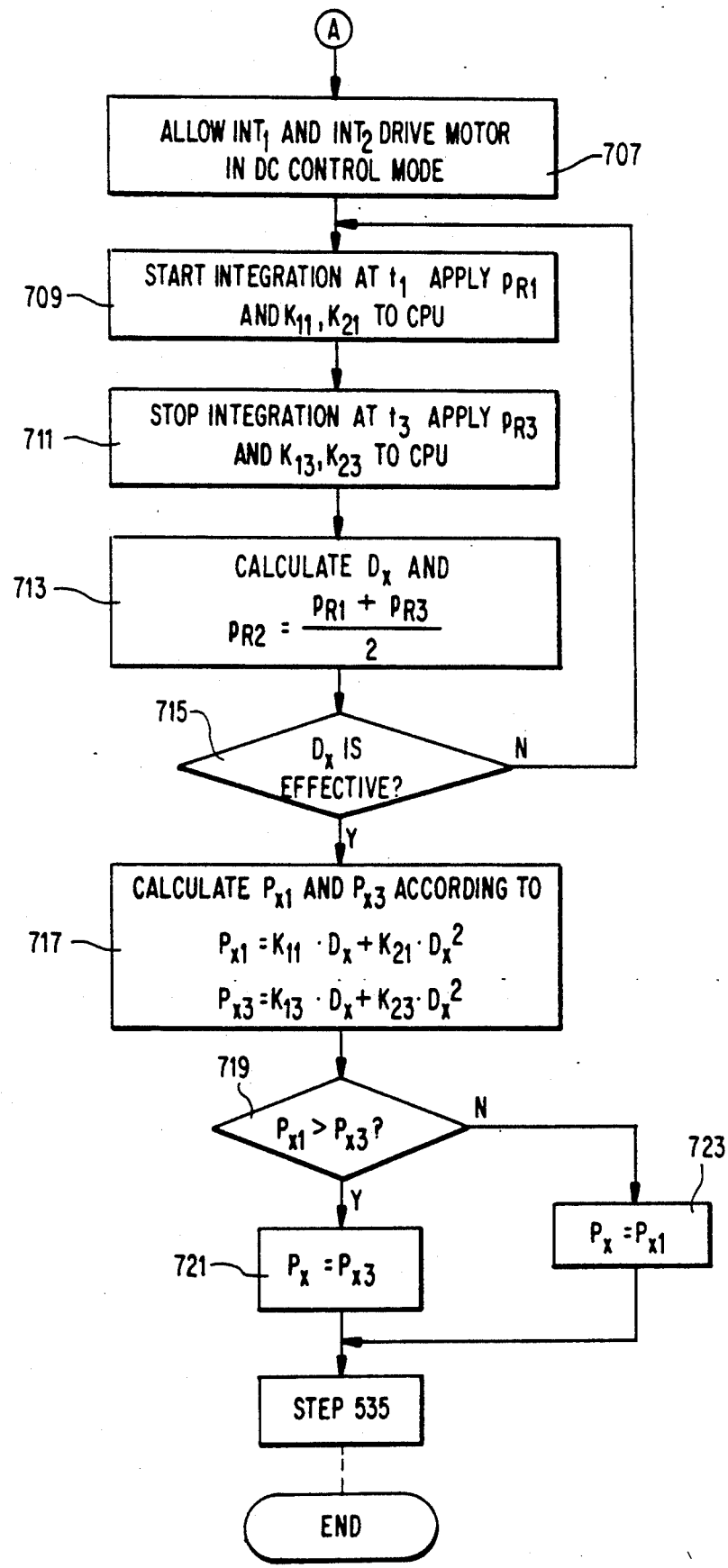

In the embodiment described with reference to FIG. 8, assuming that the integration period of time of the CCD sensor is extremely short, the coefficient shows almost linear variation during such an integration period of time and the amount of drive $P_{X3}$ at the time instant $t_3$ is smaller than that of $P_{X1}$, $(P_{X1}+P_{X3})/2$ may be used as the amount of drive $P_X$ for calculation of the drive amount.

Further, there is a lens system whose secondary coefficient $K_{2m}$ in the equation (4) is made substantially unchanged regardless of the lens advancement position. In this case, a certain constant value may be used as a common secondary coefficient $K_2$.

Figure 9A:
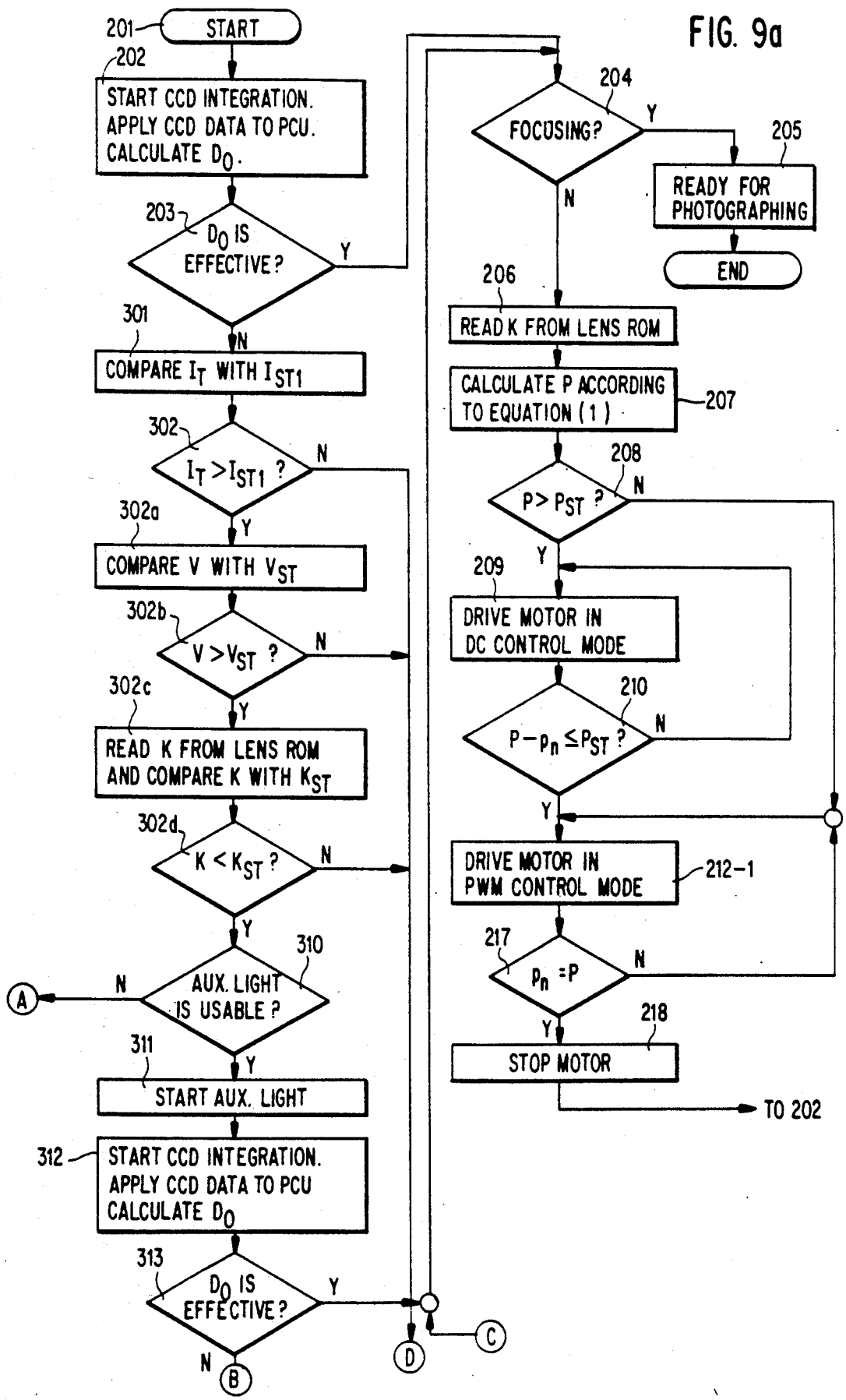
FIGS. 9a and 9b are flow charts showing a fourth embodiment of the operation of the focusing device according to the present invention.
Figure 9B:
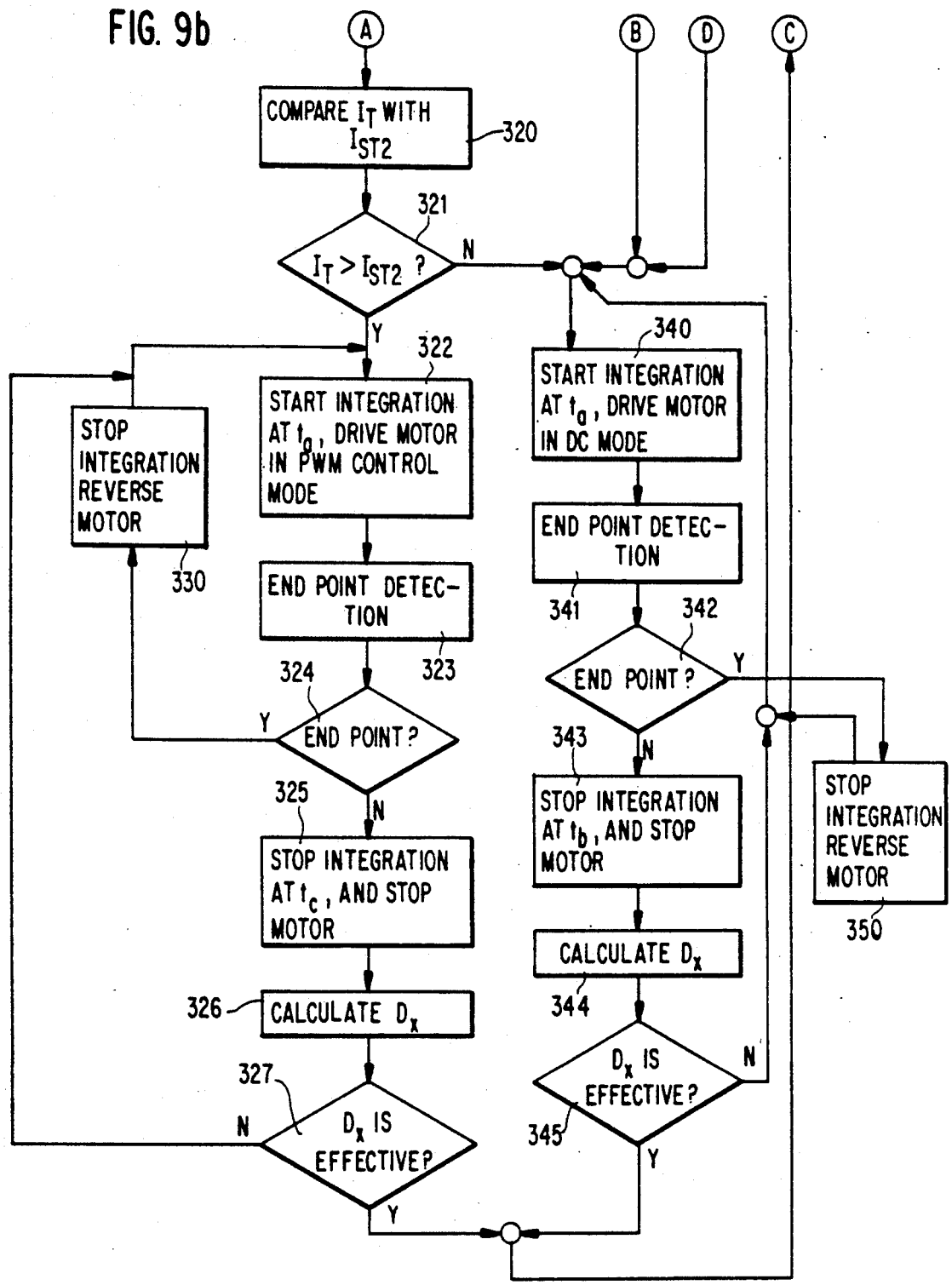

The fourth embodiment of the present invention in which the brightness of the object is detected to change the movement speed of the movable lens 53, will be described with reference to FIGS. 9 and 10. In FIG. 9, the steps same as those in FIG. 3(B) bear the same step numbers, description therefor is intentionally omitted.

In case of $I_T > I_{ST1}$ (Step 302), it is detected that the brightness is insufficient and the CCD sensor does not receive an amount of light which is necessary for the focusing operation.

In the case where the defocusing amount is ineffective and the brightness is insufficient, the integration of the CCD sensor is carried out while the movable lens 53 is driven at a low speed in the PWM control mode. In this case, however, it is possible to accomplish the focusing operation with high accuracy in the following manner.

In case of $I_T > I_{ST1}$, the CPU 101 operates to output an A/D conversion start signal to the A/D converter 201 to start the A/D conversion of the voltage level of the power source 201. In response to the start signal, the A/D converter 201 produces a digital signal V representing the power source voltage level to the CPU 101. The CPU 101 receives the digital signal in a well known method such as an interruption method in response to an interruption signal and a busy control method.

In the steps 302a and 302b, the comparison means 101c compares the digital signal V with a reference voltage value $V_{ST}$ stored in the memory means 101a. This comparison result is used to determined the driving condition of the movable lens. Even in case of the brightness being insufficient, if the power source voltage is lowered, the movement speed of the movable lens 53 is not so high in the DC control mode. Further, if the AF motor 95a is driven in the PWM control mode with low power source voltage, there is a possibility that the movable lens 53 may not be driven resulting in an occurrence of a problem.

In case of $V > V_{ST}$, a coefficient K corresponding to the lens 51 is read out from the lens ROM 57 to the CPU 101 in the step 302c. The coefficient K is compared in the comparison means 101c with a reference coefficient $K_{ST}$ stored in the memory means 101a. Provided that a lens system whose coefficients are variable according to lens advancement positions or zooming positioned is used, coefficients corresponding thereto are read out to be compared with the reference coefficient $K_{ST}$. (step 302d). This is carried out to determined the driving condition of the movable lens 53 in view of such a drawback that the movable lens is roughly moved with small coefficient K.

It should be noted that these steps 302a to 302d may be omitted.

In the case where it is detected that the brightness is insufficient, it is detected whether an auxiliary light projecting device can be used or not in the step 310. If such an auxiliary light projecting device is not provided to the camera, "No" is issued in the step 310. In this case, the above described integration time $I_T$ is compared with another reference time $I_{ST2}$ longer than the $I_{ST1}$ in the step 301. Then, if $I_T > I_{ST2}$, it is determined in the steps 321 and 322 that the brightness of the object is very low. The comparison means 93a operates to produce to the switching means 93b a control signal to drive the motor 95a in the PWM control mode. At a time instant $t_a$ when the movable lens 53 Starts moving in one direction at a low speed, the integration of the CCD sensor is started. The integration of the CCD sensor is continuously carried out by a time instant $t_c$. During this period of $(t_c - t_a)$, it is always detected whether the movable lens 53 reaches an end point in the one direction (steps 323, 324). If the movable lens 53 reaches the end point by the time instant $t_c$, the integration is stopped and the rotation of the motor is reversed (step 330). The operation is returned to the step 322.

If the no end point is detected by the time instant $t_c$, the integration is stopped and the motor is also stopped (step 325). In the following step 326, the defocusing amount $D_x$ is calculated to be subjected to evaluation whether it is effective or not in the step 327. In case of being ineffective, the steps 322 to 327 are carried out repeatedly.

In case of $I_T \leq I_{ST2}$ in the step 321, or in case of "No" in the step 302b or 302d even in the case where the brightness is low, the comparison means 93a produces a control signal to the switching means 93b to drive the motor in the DC control mode. In response to the control signal, the AF motor 95a is driven at a high speed so that the movable lens 53 starts moving in the one direction at a speed higher than that in the PWM control mode (step 340). At that time $t_a$, the integration is also started.

The integration of the CCD sensor is continuously carried out by a time instant $t_b$. During this period of $(t_b - t_a)$, it is always detected whether the movable lens 53 reaches an end point in the one direction (steps 341, 342). In this case, the light amount necessary for the CCD sensor is obtained in a short period of time, it is possible to determine the period of time as $(t_b - t_a) < (t_c - t_a)$.

If the movable lens 53 reaches the end point by the time instant $t_b$, the integration is stopped and the rotation of the motor is reversed. The operation is returned to the step 340.

If the no end point is detected by the time instant $t_b$, the integration is stopped and the motor is also stopped (step 343). In the following step 344, the defocusing amount $D_x$ is calculated to be subjected to evaluation whether it is effective or not in the step 345. In case of being ineffective, the steps 340 to 345 are carried out repeatedly.

Next, in the case where the "No" is issued in the step 302, that is in case of $IT \leq IST$ and the data being supplied to the CCD sensor, it is determined that the defocusing amount is extremely large. As a result, the AF motor 95a is thus driven to move the movable lens. This is carried out by the above described steps 340 to 345.

In case of the auxiliary light projecting device being usable (step 310), a light pattern beam having a zebra pattern is projected to the object to give some contrast thereto. Upon projection, the integration is started simultaneously. After a predetermined integration time, the projection of the pattern light beam is stopped and then the defocusing amount $D_0$ is calculated in the steps 311 and 312. Thereafter, it is determined in the step 313, as is similar in the step 203, whether the defocusing amount $D_0$ is effective or not. In case of being ineffective, the operation is carried out according to the steps 340 to 345.

Next, the operation in case of the defocusing amount being in effective in the step 203, 313, 327 or 345 will be described. In this case, the defocusing amount is expressed as $D_X$. The operation is substantially same as that in the steps 204 to 218 shown in FIG. 3(B).

In the case where the amount of defocusing $D_0$ or $D_X$ (=D) is effective, it is determined whether or not the lens is focused on the object (Step 204). This determination is carried out by the arithmetic means 101b and the comparison means 101c of the CPU 101 for instance in the following manner: Assuming that the amount of lateral shift t when focusing is obtained is expressed as $t_0$, when a value of $|t_{min}-t_0|$ where $t_{min}$ is the value obtained according to the above-described equation (b), is smaller than a reference value $t_s$ stored in the memory means 101a, it is determined that the lens is focused on the object. When it is determined that the lens is focused on the object, the photographing preparatory operation is ended (Step 205).

In the case when the amount of defocusing D is effective but the lens is not focused on the object yet, the movable lens 53 (FIG. 2) is moved to the focused position.

The coefficient K is inputted from the lens ROM 57 of the photographing lens 51 into the arithmetic means 101b of the CPU 101. In case of using the equation (3), the coefficients $K_1$ and $K_2$ are inputted from the lens ROM 57 of the photographing lens 51 into the arithmetic means 101b of the CPU 101.

The coefficient K and the amount of defocusing D are used to obtain the pulse count value P, which corresponds to the amount of drive of the movable lens to the focused position, according to the equation (1) (in case of reading both $K_1$ and $K_2$, according to the equation (3)) (Step 207).

Thereafter, while the AF motor 95a rotates in the correct direction, the pulse count value $p_n$ is calculated. The counting operation can be carried out by an ordinary counter in the PCU 93, the CPU 101 or the like.

During the AF motor 95a being driven, the drive force of the motor 95a is transmitted through the clutch 95c on the body side and the clutch 55a on the lens side to the movable lens 53 to move the latter 53 to the focused position.

In this embodiment, the drive method of the AF motor 95a is changed in response to the amount of defocusing D as follows: First, in the comparison means 101c, the pulse count value P obtained from the equation (1) is compared with a reference pulse count value $P_{ST1}$ stored in the memory means 101a of the CPU 101 in advance (Step 208), and the result of comparison is applied to the switching means 93b of the PCU 93. When $P > P_{ST1}$ (the defocusing amount being large), the switching means 93b selects the DC control mode so that the AF motor 95a rotates at a constant high speed in the DC control mode (Steps 208, 209). On the other hand, when $P \leq P_{ST1}$, the AF motor 95a is driven in the PWM control mode to move the lens gradually in the PWM control mode (steps 210, 212-1).

In the DC control mode or the PWM control mode, the total pulse count value $p_n$ is always detected. When the difference $(P-p_n)$ between the initial drive pulse count value P and the total pulse count value $p_n$ from the start of rotation is equal to or smaller than $P_{ST}$ $\{(P-p_n) \leq P_{ST}\}$, the operation mode of the AF motor is changed to the PWM control mode (Steps 210, 212-1). Finally, when $P=p_n$, the motor 95a is stopped so that the movement of the movable lens 53 to the focused position is completed (steps 217, 218).

Figure 11A:
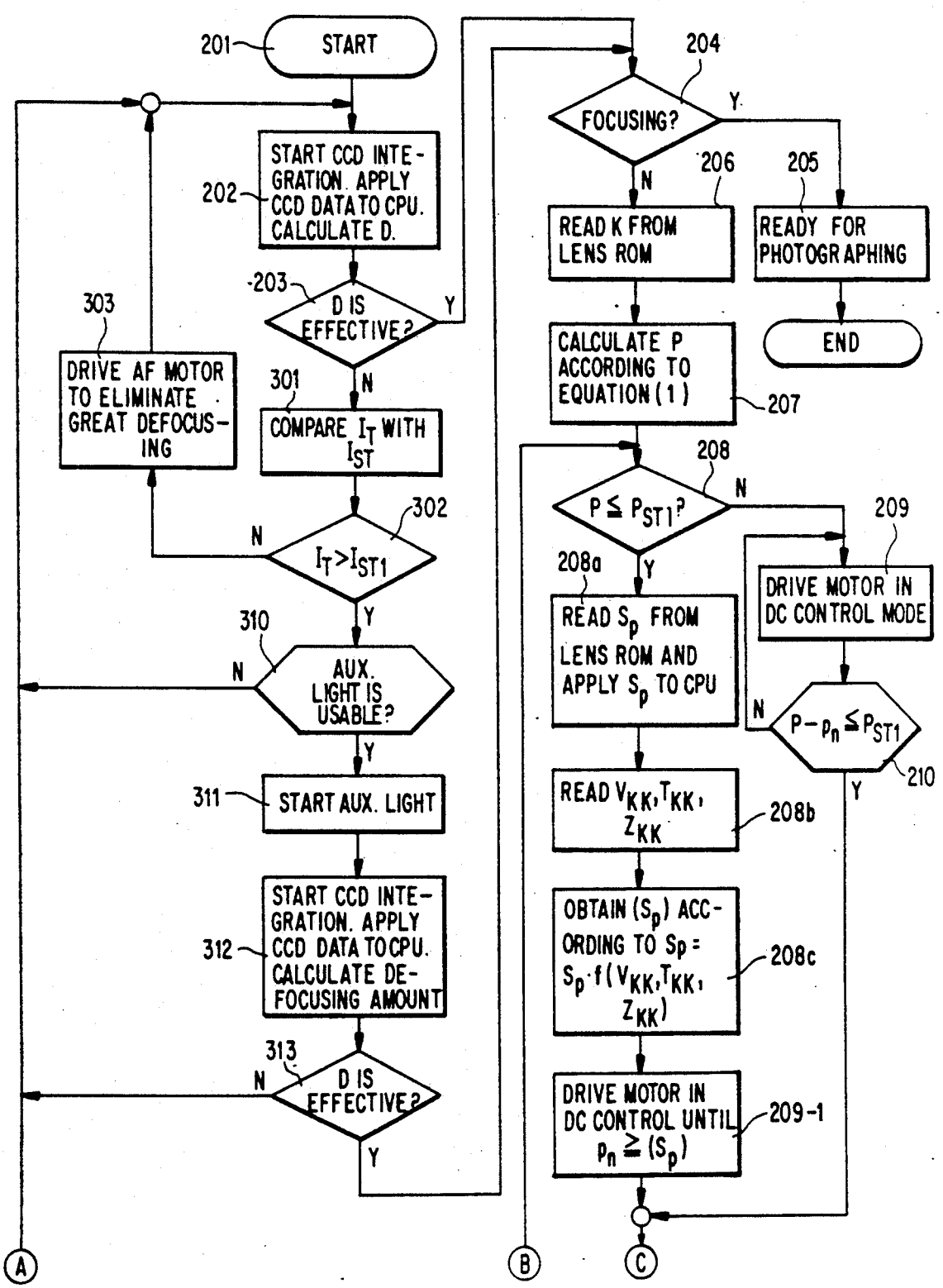
FIGS. 11a and 11b are flow charts for the fifth embodiment of the present invention.
Figure 11B:
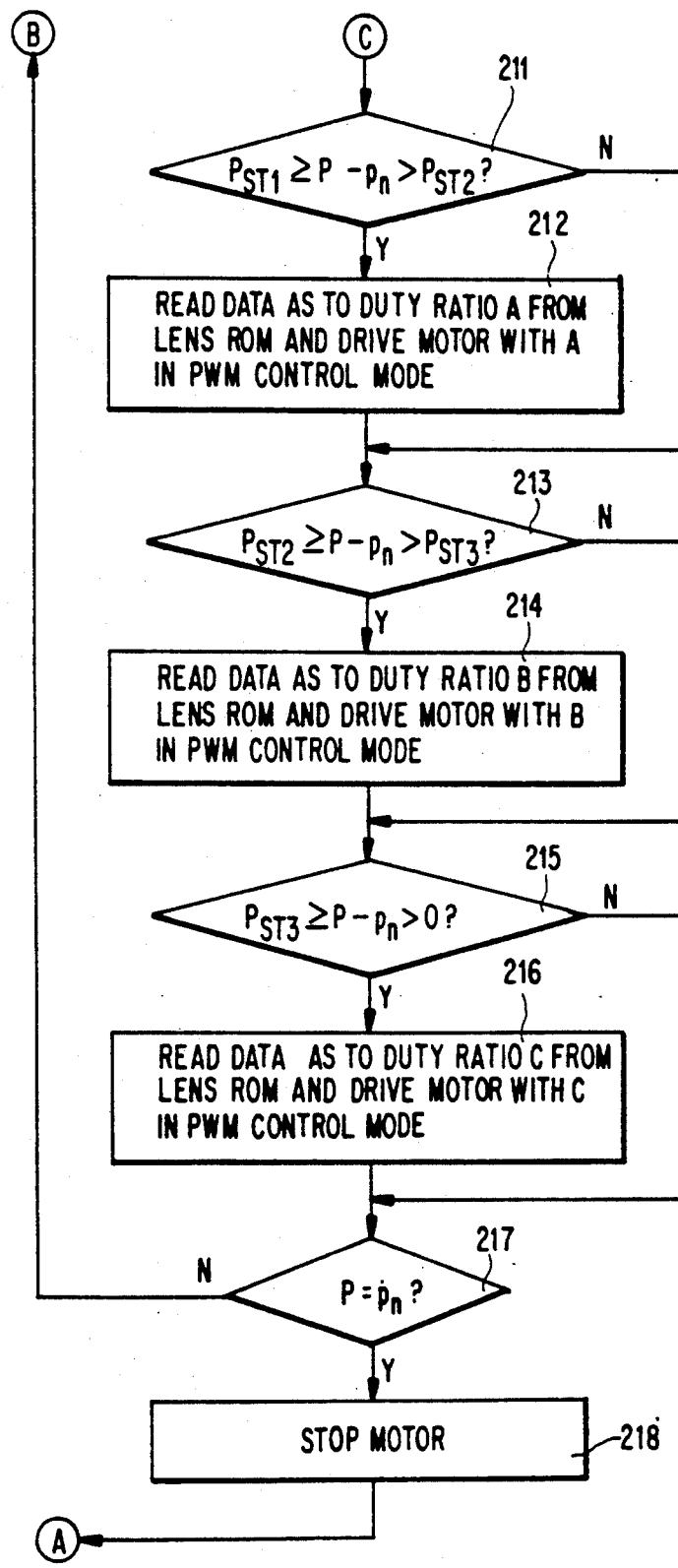

FIG. 11 is a flow chart for the fifth embodiment of the present invention, in which the above described voltage correction coefficient $V_{KK}$, temperature correction coefficient $T_{KK}$ and other correction coefficients $Z_{KK}$ are taken into consideration. The flow chart shown in FIG. 11 is identical to that shown in FIG. 3(B) other than the steps 208a to 210-1 between the steps 208 and 211. Therefore, the following is only a description as to the steps 208a to 210-1.

As a result of the comparison of the pulse count value (the amount of drive) P and the reference pulse value $P_{ST1}$, the AF motor 95a is controlled so that the movable lens 53 is prevented from overrunning the focused position.

In case of $P \leq P_{ST1}$ in the step 208, the CPU 101 operates to read out start pulse data $S_p$ from the lens ROM 57 to the arithmetic means 101b (step 208a). Further, the CPU 101 operates to read out the voltage correction coefficient $V_{KK}$, the temperature correction coefficient $T_{KK}$ and the like which are obtained by the circuit shown in FIG. 12, from the memory means 101a to the arithmetic means 101b. Provided that the other coefficients $Z_{KK}$ are further stored in the memory means 101b, they are also read out to the arithmetic means 101b (step 280b). Then, the start pulse data Sp is corrected using these coefficients to obtain corrected start pulse data [Sp] according to the following equation (5) in the step 208c.

$$[Sp]=Sp \cdot f(V_{KK}, T_{KK}, Z_{KK}) \qquad (5)$$

Subsequently, the Af motor 95a is driven in the DC control mode, and the drive of the motor is continuously carried out until the total pulse count value $p_n$ becomes larger than the number of pulses which is expressed by the above equation (5).

On the other hand, in case of $P > P_{ST1}$ in the step 208, the AF motor 95a is driven at the high speed in the DC control mode (209-1). During the drive of the Af motor in the DC control mode, the 101b calculates the difference between the pulse count value P and the pulse count value $p_n$ of the signal from the encoder, that is the remaining amount of drive to the focused position. The $(P=p_n)$ is compared with the $p_{ST1}$ in the comparison means 101c (Step 210-1). In case of $(P-p_n) \leq P_{ST1}$ in the step 208, the operation advances to the following step 211. On the other hand, in case of $(P-p_n) > P_{ST1}$, the operation is returned to the step 209-1.

Figure 13:
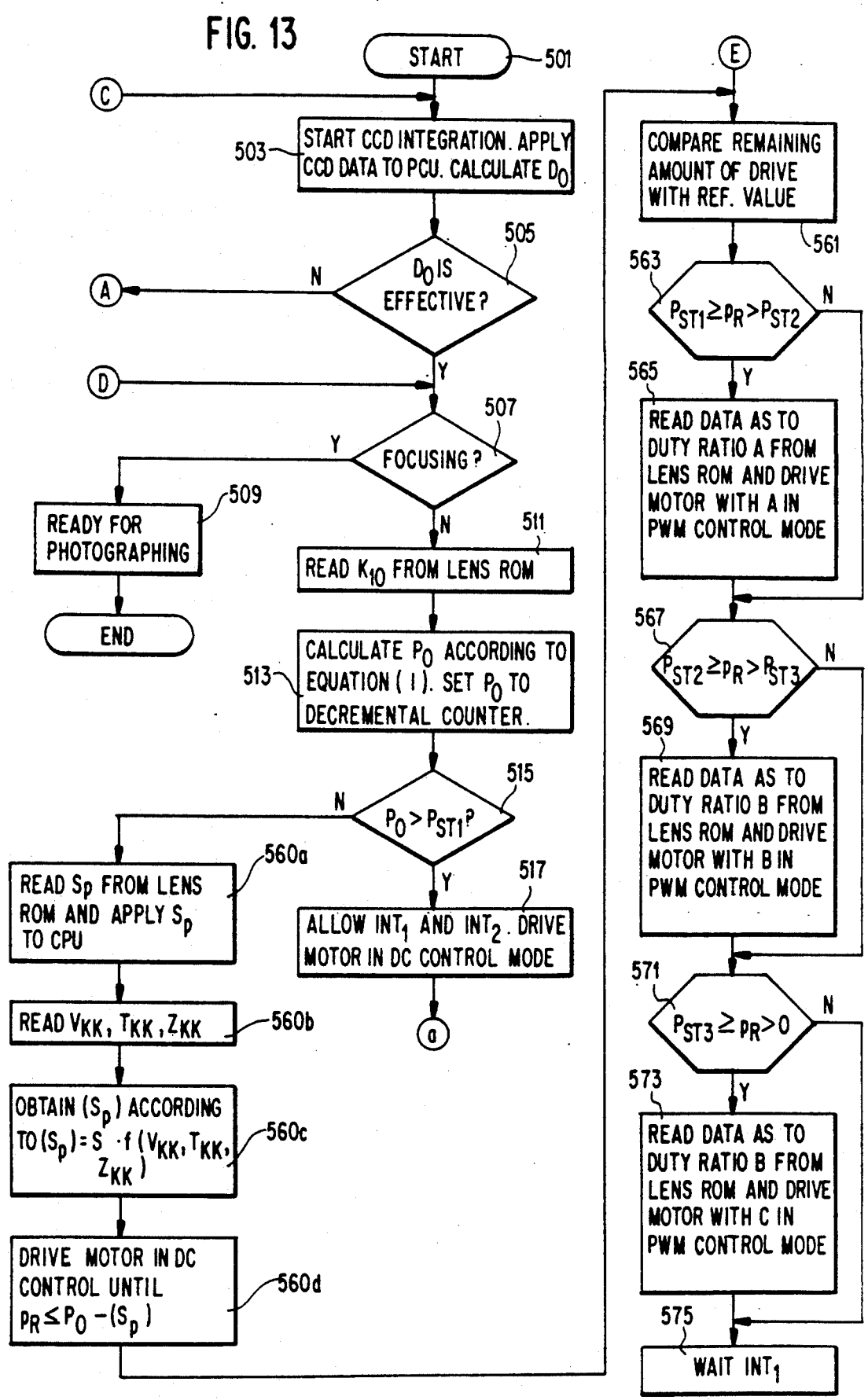
FIG. 13 is a flow chart for a description of the sixth embodiment of the present invention.

Finally, the sixth embodiment will be described with reference to FIG. 13. FIG. 13 is also a flow chart showing the sixth embodiment of the present invention, which is substantially same as that of FIG. 6(A) showing a part of the flow chart of the second embodiment. The sixth embodiment includes the steps 560a to 560d same as those 208a to 209-1 shown in FIG. 11 between the steps 515 and 561 to determined the start pulse data after taking the above described various correction coefficients into account. Therefore, detailed description as to the steps is omitted here intentionally.

Modifications are possible without departing from the scope of the present invention. More specifically, in case of using a zoom lens system, plural sets of coefficients which correspond to a variety of the lens positions may be stored in a plurality of lens ROMs, respectively, for various zooming positions. The addressing operation for the lens ROMs may be carried out by using a code plate similar to the distance plate described above, which varies its code in response to the rotation movement of a zooming ring of the lens system.

What is claimed is:

1. An automatic focusing device comprising:
   a lens system including a focusing lens;
   drive means for driving said focusing lens to a focused position relative to an object;
   a first means for calculating an amount of defocusing for the object;
   a second means for determining whether the calculated amount of defocusing of said first means is effective in controlling said drive means;

a third means for detecting a power source voltage for said drive means; and a first comparator for comparing the detected power source voltage of said third means with a reference voltage;

wherein said drive means drives said focusing lens to the focused position according to a DC mode of operation when said second means determines that the calculated amount of defocusing is not effective in controlling said drive means and said first comparator determines that the detected power source voltage is less than said reference voltage.

2. The automatic focusing device as defined in claim 1, further comprising:

a fourth means for determining whether auxiliary lighting of the object is possible;

wherein said drive means drives said focusing lens according to a pulse width modulation control mode when said second means determines that the calculated amount of defocusing is not effective for controlling the drive means, said first comparator determines that the detected power source voltage is greater than the reference voltage, and said fourth means determines that auxiliary lighting is not possible, thereby preventing the focusing lens from overrunning a focused position relative to the object.

3. The automatic focusing device as defined in claim 1, further comprising a memory for storing a reference focusing amount, wherein said second means comprises a comparator, coupled to said memory and said first means, for comparing the reference focusing amount with the calculated focusing amount.

4. The automatic focusing device as defined in claim 1, further comprising:

a fourth means for determining whether auxiliary lighting of the object is possible;

wherein the auxiliary lighting is carried out when said second means determines that the calculated amount of defocusing is not effective for controlling the drive means, a brightness of the object is insufficient, said first comparator determines that the detected power source voltage is less than the reference voltage and the auxiliary lighting is possible.

5. The automatic focusing device as defined in claim 4, further comprising:

an image pickup section including a charge-coupled sensor;

a memory for storing a reference integration time for said sensor; and a second comparator for comparing an integration time of said charge-coupled sensor with the stored reference integration time;

wherein a condition of insufficient brightness of the object is detected when said second comparator determines that the integration time of said charge-coupled sensor is greater than the reference integration time.

6. The automatic focusing device as defined in claim 4, wherein said first means calculates the amount of defocusing for the object again under the auxiliary lighting.

7. The automatic focusing device as defined in claim 4, wherein when auxiliary lighting is impossible, said drive means drives said focusing lens according to a pulse width modulation control mode.

8. An automatic focusing device comprising:

a lens system including a focusing lens;

drive means for driving said focusing lens to a focused position relative to an object;

a first means for calculating an amount of defocusing for the object;

a second means for determining whether the calculated amount of defocusing of said first means is effective in controlling said drive means;

a first comparator for comparing a lens movement conversion coefficient read out from a lens ROM of said lens system with a reference coefficient, wherein said drive means drives said focusing lens to the focused position according to a DC mode of operation when said second means determines that the calculated amount of defocusing is not effective in controlling said drive means and said first comparator determines that the lens movement conversion coefficient is greater than said reference coefficient.

9. The automatic focusing device as defined in claim 8, further comprising:

a third means for determining whether auxiliary lighting of the object is possible;

wherein said drive means drives said focusing lens according to a pulse width modulation control mode when said second means determines that the calculated amount of defocusing is not effective for controlling the drive means, said first comparator determines that the lens movement conversion coefficient is less than the said reference coefficient, and said fourth means determines that auxiliary lighting is not possible, thereby preventing the focusing lens from overrunning a focused position relative to the object.

10. The automatic focusing device as defined in claim 8, further comprising a memory for storing a reference focusing amount, wherein said second means comprises a comparator, coupled to said memory and said first means, for comparing the reference focusing amount with the calculated focusing amount.

11. The automatic focusing device as defined in claim 8, further comprising:

a fourth means for determining whether auxiliary lighting of the object is possible;

wherein auxiliary lighting is carried out when said second means determines that the calculated amount of defocusing is not effective for controlling the drive means, a brightness of the object is insufficient, said first comparator determines that the lens movement conversion coefficient is less than the reference coefficient, and auxiliary lighting is possible.

12. The automatic focusing device as defined in claim 11, further comprising:

an image pickup section including a charge-coupled sensor;

a memory for storing a reference integration time for said sensor; and a second comparator for comparing an integration time of said charge-coupled sensor with the stored reference integration time;

wherein a condition of insufficient brightness of the object is detected when said second comparator determines that the integration time of said charge-coupled sensor is greater than the reference integration time.

13. The automatic focusing device as claimed in claim 11, wherein said first means calculates the amount of defocusing for the object again under auxiliary lighting.

14. The automatic focusing device as claimed in claim 11, wherein when auxiliary lighting is impossible, said drive means drives said focusing lens according to a pulse width modulation control mode.

* * * * *